US011727587B2

(12) United States Patent
Pugh et al.

(10) Patent No.: US 11,727,587 B2
(45) Date of Patent: Aug. 15, 2023

(54) METHOD AND SYSTEM FOR SCENE IMAGE MODIFICATION

(71) Applicant: Geomagical Labs, Inc., Mountain View, CA (US)

(72) Inventors: Brian Pugh, Mountain View, CA (US); Angus Dorbie, Redwood City, CA (US); Salma Jiddi, Mountain View, CA (US); Qiqin Dai, Mountain View, CA (US); Paul Gauthier, Mountain View, CA (US); Marc Eder, Mountain View, CA (US); Jianfeng Yin, Mountain View, CA (US); Luis Puig Morales, Mountain View, CA (US); Michael Otrada, Mountain View, CA (US); Konstantinos Nektarios Lianos, Mountain View, CA (US); Philip Guindi, Mountain View, CA (US); Brian Totty, Mountain View, CA (US)

(73) Assignee: Geomagical Labs, Inc., Mountain View, CA (US)

( * ) Notice: Subject to any disclaimer, the term of this patent is extended or adjusted under 35 U.S.C. 154(b) by 96 days.

(21) Appl. No.: 17/096,814

(22) Filed: Nov. 12, 2020

(65) Prior Publication Data
US 2021/0142497 A1  May 13, 2021

Related U.S. Application Data

(60) Provisional application No. 62/934,387, filed on Nov. 12, 2019.

(51) Int. Cl.
*G06T 7/543* (2017.01)
*G06T 7/60* (2017.01)
*G06T 7/90* (2017.01)
*G06T 19/20* (2011.01)
*G06T 7/73* (2017.01)

(52) U.S. Cl.
CPC ............... *G06T 7/543* (2017.01); *G06T 7/60* (2013.01); *G06T 7/73* (2017.01); *G06T 7/90* (2017.01); *G06T 19/20* (2013.01); *G06T 2207/10028* (2013.01)

(58) Field of Classification Search
CPC .. G06T 7/543; G06T 7/73; G06T 7/90; G06T 7/60; G06T 19/20; G06T 2207/10028
See application file for complete search history.

(56) References Cited

U.S. PATENT DOCUMENTS

| | | | |
|---|---|---|---|
| 9,131,209 B1 * | 9/2015 | Demirbağ | H04N 13/15 |
| 9,613,453 B2 * | 4/2017 | Hernandez Esteban | G06T 13/20 |
| 9,836,885 B1 * | 12/2017 | Eraker | G06F 3/04842 |
| 10,186,074 B1 * | 1/2019 | Esteban | G06T 15/205 |
| 10,832,487 B1 * | 11/2020 | Ulbricht | G06T 7/30 |
| 10,950,021 B2 * | 3/2021 | Dubey | G06T 7/11 |
| 11,269,350 B2 * | 3/2022 | Hillen | G05D 1/0219 |
| 11,315,278 B1 * | 4/2022 | Ulbricht | G06V 10/242 |
| 2010/0287511 A1 | 11/2010 | Meier et al. | |

(Continued)

OTHER PUBLICATIONS

"Realtime Object Occlusion In Augmented Reality Environments" https://www.semanticscholar.org/paper/Realtime-Object-Occlusion-In-Augmented-Reality-Shah/0329d772efe01b5d818dfc22e4a357d03324a01e?utm_source=email.

*Primary Examiner* — Gregory M Desire
(74) *Attorney, Agent, or Firm* — Amardeep S. Grewal; Reed Smith LLP

(57) ABSTRACT

System and method for rendering virtual objects onto an image.

45 Claims, 23 Drawing Sheets

(56) References Cited

U.S. PATENT DOCUMENTS

2017/0076142 A1* 3/2017 Chang .................. G06T 7/90
2021/0019892 A1* 1/2021 Zhou ................... G06T 7/11
2021/0142497 A1* 5/2021 Pugh ................... G06T 7/90

* cited by examiner

METHOD AND SYSTEM FOR SCENE IMAGE MODIFICATION

CROSS-REFERENCE TO RELATED APPLICATIONS

This application claims priority to U.S. Provisional Application No. 62/934,387, filed 12 Nov. 2019, which is incorporated herein in its entirety by this reference.

TECHNICAL FIELD

This invention relates generally to the image generation field, and more specifically to a new and useful method and system for enabling 3D scene modification from imagery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
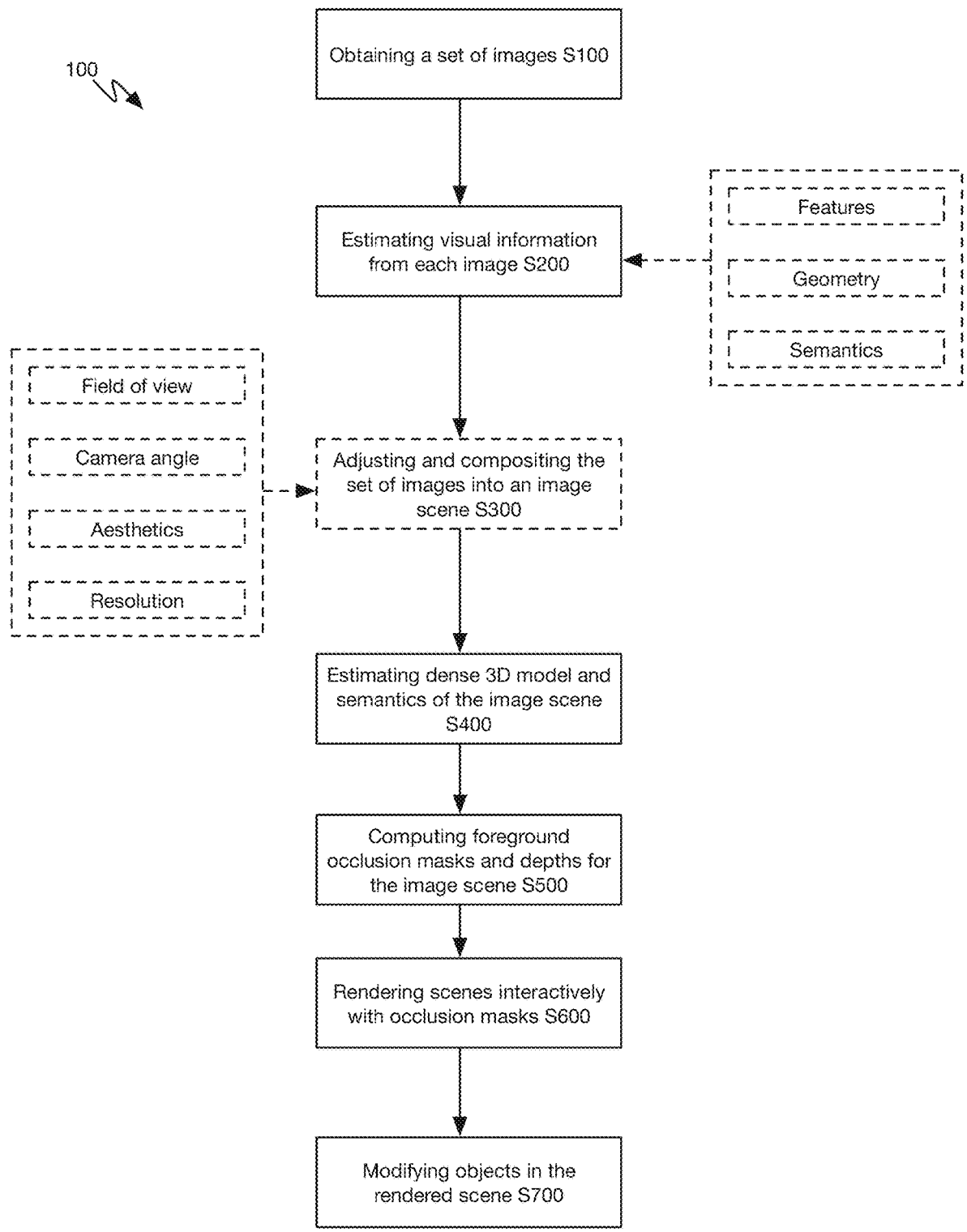
FIGS. 1A-I are schematic representations of the method.
Figure 1B:
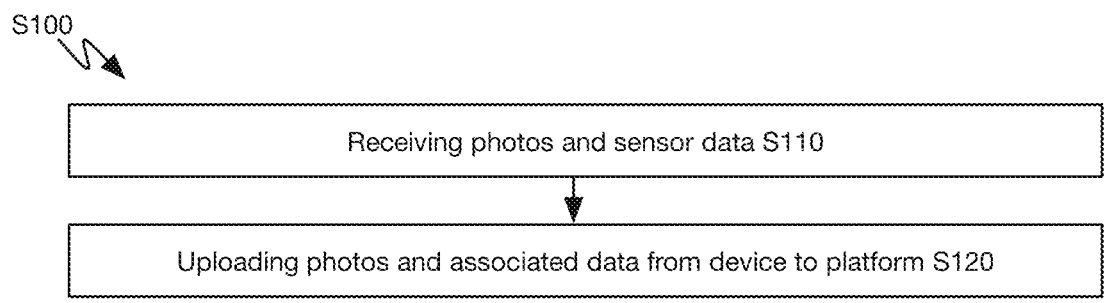
Figure 15:
FIG. 15 is an example of the output of the method.

A method for modifying scene imagery as shown in FIG. 1A preferably includes one or more of: obtaining a set of images S100, estimating visual information from each image S200, estimating a dense 3D model and semantics of the scene imagery S400, computing foreground occlusion masks and depths for the scene imagery S500, rendering scenes interactively with occlusion masks S600, and modifying at least one object in the rendered scene S700, but the method can additionally or alternatively include adjusting and compositing the set of images into scene imagery S300 and/or any other suitable element. The method functions to generate an editable, photorealistic digital representation of the physical scene that was captured by the set of images. An example of a generated editable, photorealistic digital representation of the physical scene is depicted in FIG. 15.

All or portions of the method can be performed at a predetermined frequency, performed upon occurrence of an execution event (e.g., upon a user navigating to a front-end/end user application on a user device (e.g., 210 shown in FIG. 2), upon a user submitting images to an image processing platform (e.g., 220 shown in FIG. 2), or any other suitable execution event), performed in real- or near-real time, performed asynchronously, or performed at any other suitable time. All or a portion of the method can be performed locally at a user device or capture device (e.g., smartphone), remotely at a remote processing system, at a combination thereof (e.g., wherein raw, derivative, or other data is transmitted between local and remote systems), or otherwise performed.

Figure 3:
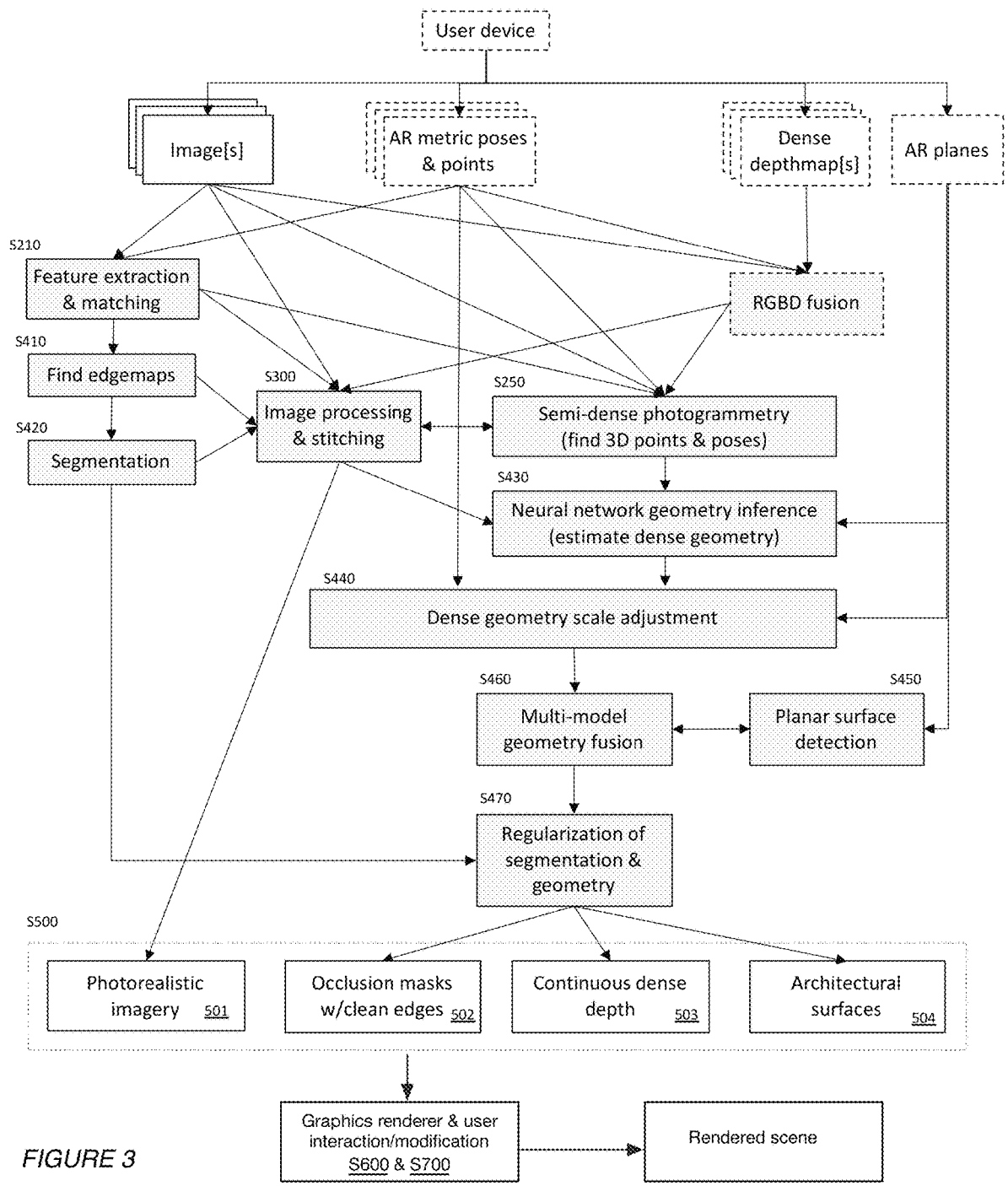
FIG. 3 is an example of the method.
Figure 14:
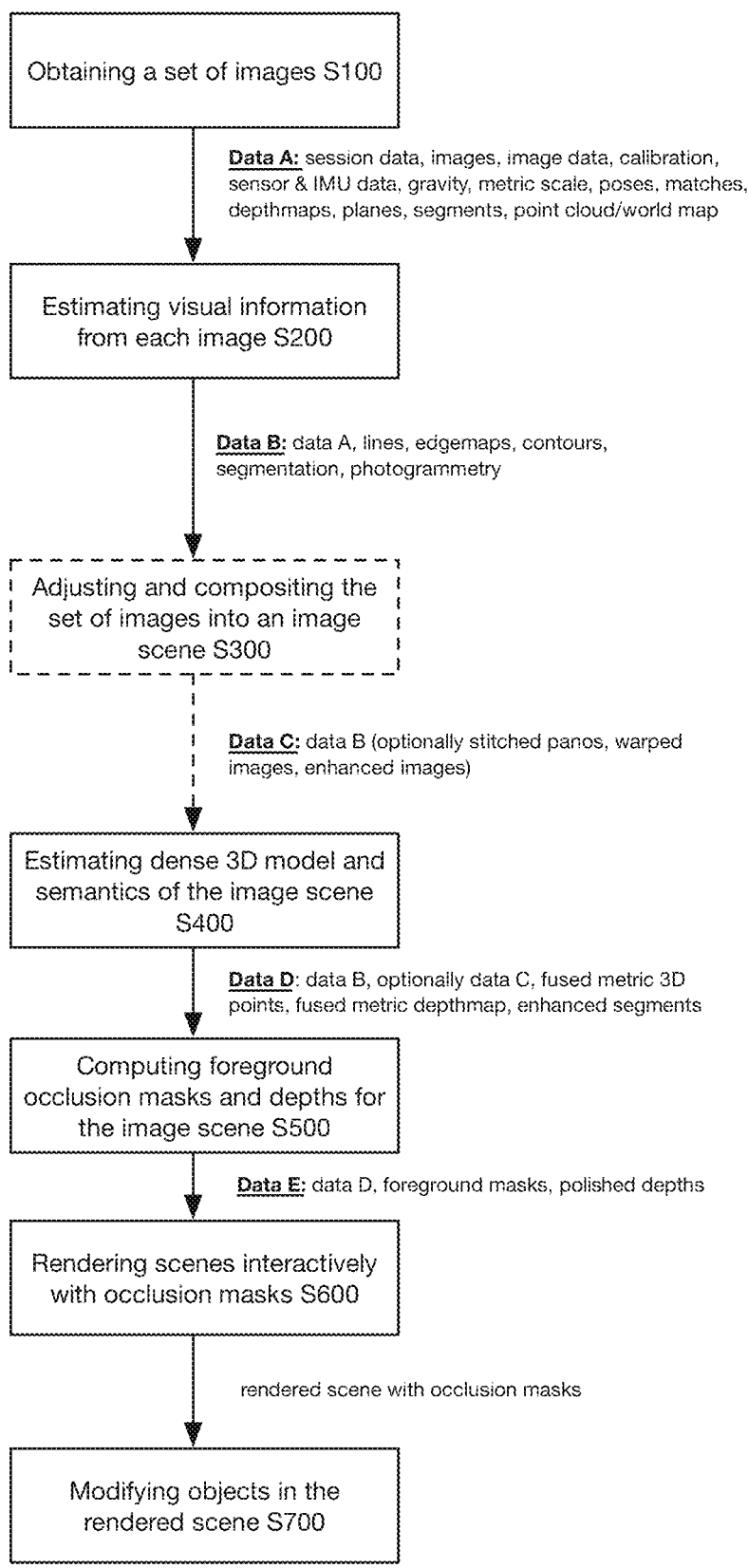
FIG. 14 is an example of data passed between the method processes.

As shown in FIG. 3 and FIG. 14, in examples, the method includes one or more of: obtaining an image, that includes one or more objects; determining metric scale data (e.g., ARkit™, ARCore™, SLAM information, visual-inertial odometry, IMU information, binocular stereo, multi-lens triangulation, depth-from-disparity, depth sensors, range fingers, etc.) associated with the image; determining a photogrammetry point cloud from the image (e.g., using SLAM, SFM, MVS, depth sensors, etc.); determining a depth map (e.g., depth estimates for a set of image pixels; etc.) for the image (e.g., by using neural networks based on the image, the photogrammetry point cloud, hardware depth sensors, and/or any other suitable information); determining an object-class per pixel using semantic segmentation based on the image and/or one or more downsampled images of the original image and/or depthmaps; determining the floor plane(s) (e.g., using a cascade of 3D depthmap(s), surface normals, gravity, AR-detected planes, and semantic segmentation, etc.); determining edges (e.g., using image gradients or frequencies, neural networks trained to identify edges in the image, using a cascade of methods based on the image, disparity maps determined from the image, the depth map, etc.); determining a dense scaled point cloud and/or dense scaled depth map (e.g., dense, scaled, point cloud with estimated depths for every pixel) by combining the metric scale point cloud, the photogrammetry point cloud and the (dense, estimated) depth map (e.g., by generating a sparse scaled point cloud by scaling the photogrammetry point cloud with the metric scaled point cloud, then scaling the depth map with the sparse scaled point cloud); generating a dense, scaled, accurate point cloud by fusing the photogrammetry point cloud (and/or metric scale point cloud) with the depth map; correcting the edges in the dense scaled (accurate) point cloud and/or dense scaled depth map; regularizing the resulting depth map and/or point cloud using geometries/physics information; regularizing the floor plane; and determining segmentation masks for each object based on the per pixel object-classes. This example can optionally include one or more of: normalizing the regularized depth map; processing the normalized depthmap, regularized floor plane, and segmentation masks in the graphics engine plugin (e.g., fragment shader) which functions to translate the information into a form usable by the graphics engine; processing the translated information in the graphics engine (e.g., running on the user device); displaying, on the end user application, a static image output and virtual 3D objects; receiving user instructions to modify/adapt the scene; and rendering the scene based on the user instructions. However, the method can additionally or alternatively include any other suitable element and/or process implemented in any other suitable way.

In variants, the method includes reducing cast shadows when objects are removed. In a first example, cast shadows are inferred and reduced using image processing techniques. In a second example, cast shadows are inferred using trained neural networks. In a third example, cast shadows are inferred from detected and estimated light sources. In a fourth example, cast shadows are inferred from inverse rendering and/or optimization techniques using estimates of 3D light sources and/or 3D geometry. In a fifth example, cast shadows are inferred from intrinsic image decomposition. In a sixth example, cast shadows are inferred from plenoptic light field estimates.

In variants, the method performs placement processing for a virtual object, adjusting the occlusion behavior based on object type and placement context. For example, rather than having a real object occlude a virtual object, the virtual object can be placed in the image in a non-occluding manner in according to one or more placement processing techniques and situations.

In some variations, performing placement processing for a virtual object includes mapping 2D mouse or touch coordinates to a 3D scene position for a virtual object. In a first variant, if the virtual object being placed is a floor-mounted object (e.g., a sofa), 2D mouse or touch coordinates are mapped to a corresponding 3D scene position on a 3D floor plane. In some implementations, placement of virtual objects on a floor plane is constrained to areas of open floor.

In a second variant, if the virtual object being placed is a wall-mounted object (e.g., a mirror or wall art), 2D mouse or touch coordinates are mapped to a 3D scene position on a 3D wall plane, not the corresponding location on the floor plane, which would typically be located behind the wall. In some implementations, placement of virtual objects on a floor plane is constrained to areas of open wall.

In a third variant, if the virtual object being placed is a stackable object (e.g., a vase commonly placed on a table), 2D mouse or touch coordinates are mapped to a 3D scene position on the top of a surface in the scene (of a photorealistic image). In some implementations, the base of the 3D location of the placed object is placed on top of the scene geometry located at indexed 2D screen coordinates. In some implementations, the base of the 3D location of the placed object is computed using relative pointer motion, the scene surface mesh, and the gravity vector sliding the object along the surface contour using physically representative mechanics and collisions. In some variations, the system determines multiple viable stacking points for the object in the region of the pointer, and queries the user for selection of a stacking point to be used to place the stackable object.

2. Benefits.

The method can confer several benefits over conventional systems.

The applicant has discovered a new and useful system and method for generating an interactive, photorealistic model of a real-world scene with existing objects modeled in a manner to enable occlusions, to better provide mixed-reality interactive experiences, as compared to conventional systems and methods. In particular, the interactive platform renders virtual objects within a photographic scene, while providing believable mixed-reality depth occlusions using improved and smoothed 3D depth estimates and improved 3D edge boundaries (which are both noisy in practice). Improved object boundary depths can dramatically improve user experience, as humans are particularly sensitive to errant boundary pixels. In examples, improving the object boundary depths is accomplished by: identifying the edges within a dense (reasonably accurate) depth map (e.g., based on depth gradients, based on an edge map extracted from the same input image(s), based on a semantic segmentation map determined from the same input image(s), etc.); determining the object that the edges belong to (e.g., based on the semantic segmentation map); and correcting the edge depths based on the depth of the object that the edges belong to.

The applicant has further enabled dynamic occlusion (controllable obscuring of virtual objects by existing physical objects) and disocclusion (removal of existing foreground objects) using computer vision techniques and a standard 3D graphics engine (e.g., by developing custom shaders and transforming the visual information to a format compatible with the graphics engine).

3. System.

The system (e.g., 200 shown in FIG. 2) preferably includes one or more user devices (e.g., 210) and one or more image processing platforms (e.g., 220), but can additionally or alternatively include any other suitable elements.

The user device 210 can include: one or more end user applications (clients; native applications, browser applications, etc.) 212, one or more sensors (e.g., cameras 213, IMUs 214, depth sensors 215, etc.), one or more SLAM and/or VIO engines 216, one or more augmented reality platforms/engines (e.g., AR SDKs, such a ARkit™, ARcore™, etc.), one or more computational photography engines 217, one or more neural networks 218, one or more 3D graphics engines 211, one or more platform API engines 219, one or more administrative applications 221, but can additionally or alternatively include any other suitable components. The user device preferably ingests images in S100, optionally determines auxiliary data associated with the images in S100 (e.g., exposure information, gravity and orientation, sparse or dense depth maps, metric scale, planes, etc.), displays rendered scenes in S600, and enables scene modification in S700, but can additionally or alternatively perform any other suitable functionality. The user preferably modifies/interacts with the rendered scene via the user device, but the user can additionally or alternatively interact with the scene remotely from the user device and/or otherwise interact with the scene. The user device preferably interfaces with the platform (e.g., 220), but can additionally or alternatively include the platform and/or otherwise relate to the platform.

The image processing platform 220 preferably includes one or more client API engines 222, but can additionally or alternatively include one or more camera sensor data engines 223, one or more image processing engines 224, one or more SLAM/VIO engines 225, one or more photogrammetry engines 226, one or more reference aligners 227, one or more calibration or image aligners, one or more scale aligners 228, one or more multi-image stitcher engines 229, one or more edge boundary engines 231, one or more multi-scale segmentation engines 232, one or more geometric neural networks 233, one or more fusion engines 234, one or more regularizer engines 235, and/or any other suitable component. The platform (e.g., 220) and/or system (e.g., 200) preferably stores data in and accesses data from one or more image repositories 241, one or more image metadata repositories 242, one or more sensor data repositories 243, one or more model repositories 244, one or more geometric model repositories 245, one or more training data repositories 247 and/or one or more application data repositories 246, but can additionally or alternatively interface with any other suitable repository. The platform (e.g., 220) can be one or more distributed networks, one or more remote computing systems, included in the user device and/or any other suitable computing system.

Figure 2:
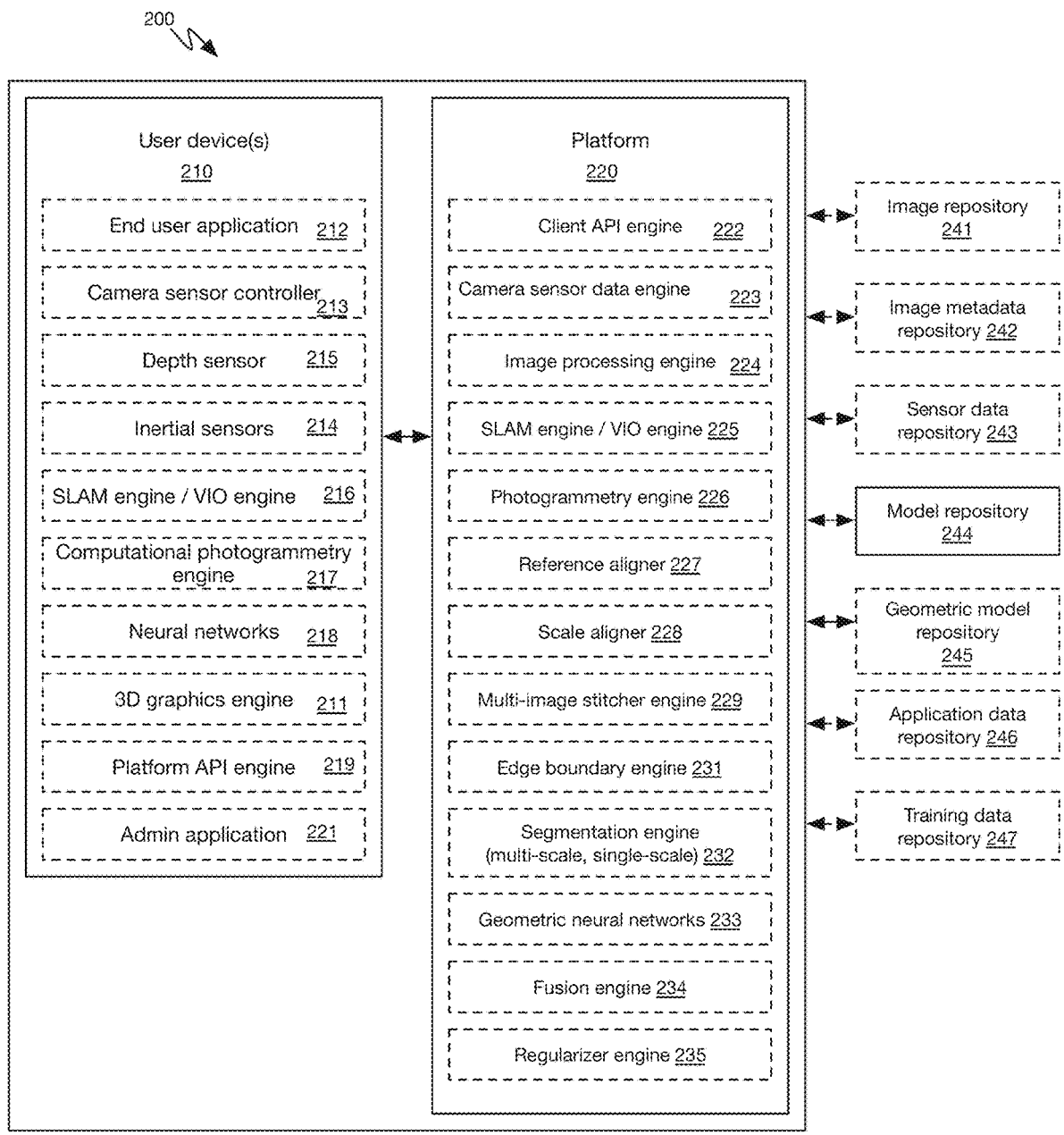
FIG. 2 is a schematic representation of the system.

An embodiment of the system components is depicted in FIG. 2.

However, the system can additionally or alternatively include any other suitable components.

4. Method.

In variants, at least one component of the system 200 (shown in FIG. 2) performs at least a portion of the method 100 (shown in FIGS. 1A-I).

4.1 Obtaining a Set of Images.

In variants, the method 100 includes obtaining at least one image S100. In a first variant, one image is obtained at S100. In a second variant, a set of several images is obtained at S100. Obtaining at least one image (S100) functions to provide base data for the generated scene. S100 preferably includes receiving and/or capturing images and associated camera and sensor data for a set of positions in a scene (e.g., the set of positions in a scene can be a set of interior positions in a room) (S110 shown in FIG. 1B). In a first implementation, the captured images and associated data is uploaded from the user device (e.g., 210) to the platform (e.g., 220) (S120 shown in FIG. 1B). In a second implementation, the captured images and associated data are stored at the user device and at least partially processed by using the user device. However, S100 can additionally or alternatively include any other suitable elements.

In variants, S100 is performed by the user device (e.g., 210 shown in FIG. 2), but can additionally or alternatively be performed partially or entirely by one or more components of the system (e.g. device, computing system), by an entity, or by any other suitable component. When the images are obtained (e.g., captured) by the user device (e.g., by the capture application, end user application 212, and/or any other suitable application), the images and/or any associated data can be transmitted from the device (e.g., 210) to a computing system (e.g., remote computing system, platform 220, etc.) either directly or indirectly (e.g., via an intermediary). However, S100 can be otherwise performed by any suitable system.

The set of images can include a single image, two or more images, five images, and/or any suitable number of images. The images of a set of images can share a common: scene (e.g., be regions of the same scene, include overlapping regions, etc.), rotation, translation, quality, alignment, altitude, be unrelated, or have any other suitable relationship. An image of a set of images can optionally have one or more subsets of images (e.g. repeat images of the same scene, close-up view of an element in the scene, cropped pieces of the captured scene, or any other suitable characteristic).

Figure 4:
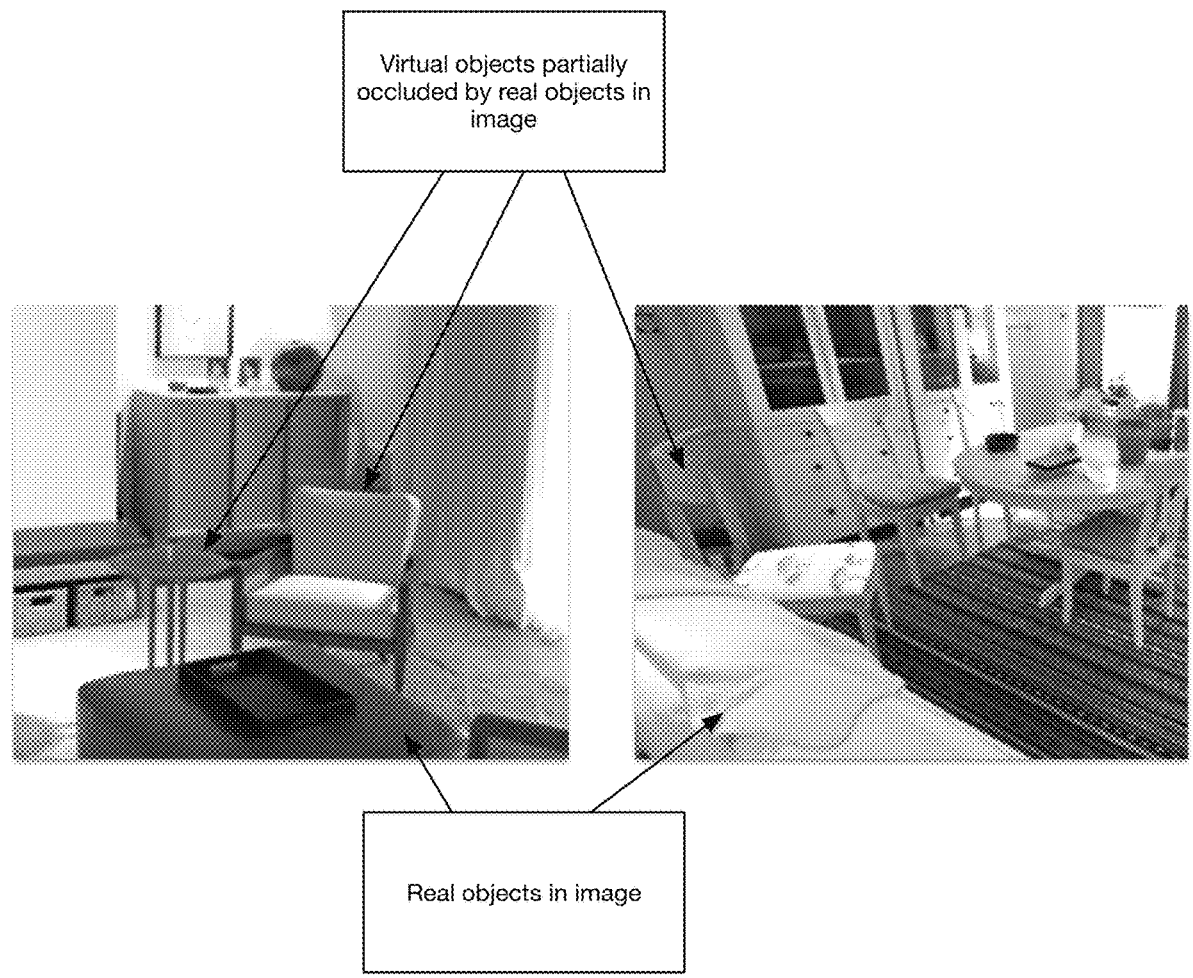
FIG. 4 is an example of S600.

A set of images preferably capture a scene, as shown in FIG. 4, but can additionally or alternatively capture an entity, or any other suitable element. The scene is preferably indoor (e.g., a room), but can additionally or alternatively be an outdoor scene, a transition from indoor to outdoor, a transition from outdoor to indoor, a collection of spaces, or any other suitable scene. The scene preferably includes one or more objects, but can additionally or alternatively include landmarks, entities, and/or any other suitable element. The sets of images can depict the same scene, but additionally or alternatively can depict different scenes, overlapping scenes, adjacent scenes, or any other suitable scene. For example, a first set of images could capture a communal space (e.g., living area, work area, dining area, lounge, reception area, etc.) and a second set of images could capture a cooking space (e.g., kitchen, commercial kitchen, kitchenette, cookhouse, galley, etc.). The images preferably capture adjacent, overlapping regions of the scene but can additionally or alternatively capture non-adjacent regions of the scene, non-overlapping regions of the scene, or any other suitable configuration of the scene.

Each image in a set of images preferably overlaps a sufficient section (e.g., 50% of the pixels, 30% of the pixels, or any other suitably sufficient overlap) of another image included in the set (e.g., preferably the one or more adjacent images, or any other suitable image). Additionally or alternatively, each sequential image pair can share an overlapping section of the scene (e.g., 0.5 meter overlap at 1 meter distance, 2 meter overlap at 1 meter distance, etc.), or have any other suitable overlap. Images of a set preferably cooperatively capture a continuous region of the scene (e.g., a horizontal region, a vertical region, a rectangular region, a spherical region, or any other suitable region). Images of a set preferably collectively cover a horizontal and vertical field of view suitably wide to cover the desired scene area without missing imagery (for example, at least 80 degree field of view horizontally and 57 degrees vertically, but can additionally or alternatively cover a larger, smaller, or any other suitable field of view. An image of a set preferably contains at least one element or feature that is present in at least one other image in the set, but can additionally or alternatively include no shared elements or features.

Each image of the set of images is preferably associated with auxiliary data. The auxiliary data can be obtained from the capture device (e.g., determined by a camera's image signal processor (ISP), or augmented reality engine), by an auxiliary sensor system, depth sensors, custom visual-inertial SLAM, known object detection, neural network estimates, user input (e.g., via the end user application 212), and/or be otherwise determined. The auxiliary data is preferably contemporaneously captured with the set of images, but can be captured asynchronously. The auxiliary data is preferably associated with the image (e.g., with image pixels, etc.) and/or set of images, but can be unassociated with the image. Examples of the auxiliary data can include: gravity and orientation information, metric scale information, a metric sparse depth map (e.g., depth measurements for a subset of the image's pixels), a metric dense depth map, plane estimates (e.g., floor planes, wall planes, etc.), camera poses, an image index (e.g., from the guided capture, such as the image's position within the guided capture; the first image, the second image, the middle image, etc.; predetermined panorama position, etc.), time, location, camera settings (e.g. ISO, shutter speed, aperture, focus settings, sensor gain, noise, light estimation, camera model, sharpness, focal length, camera intrinsics, etc.), image exposure information, two-dimensional features, three-dimensional features (e.g., depth data for a subset of the pixels per image), optical flow outputs (e.g., estimated camera motion between images, estimated camera motion during image capture, etc.), orientation and/or AR (augmented reality) and/or SLAM (simultaneous localization and mapping) and/or visual-inertial odometry outputs (e.g., three-dimensional poses, six-dimensional poses, pose graphs, maps, gravity vectors, horizons, etc.), but additionally or alternatively include any other suitable metadata. However, each image can be associated with any other suitable data.

The metric scale information is preferably a point cloud (e.g. a set of points such as 50 points, 100 points, etc.), but can additionally or alternatively be a set of metric scale camera positions, depthmaps, IMU kinematics, measurements and/or any other suitable information. The metric scale information is preferably measured in meters but can additionally or alternatively be in yards, feet, inches, centimeters, and/or any other suitable metric, however the metric scale information can be normalized or be otherwise represented. The metric scale information can be estimated from the set of images (e.g., estimate the camera location above a plane such as the floor, next to a plane such as a wall, etc.). However, the metric scale information can additionally or alternatively be otherwise determined.

S100 is preferably performed before S200, but can additionally or alternatively be performed contemporaneously. S100 can be performed during a capturing period. The capturing period can include one or more iterations of S100. For example, the capturing period can produce one or more sets of images (e.g. real, synthetic, generated, virtual, etc.). S100 can be performed on schedule and/or at any suitable time.

However, S100 can additionally or alternatively include any other suitable elements.

4.2 Estimating Visual Information from Each Image S200.

Figure 1C:
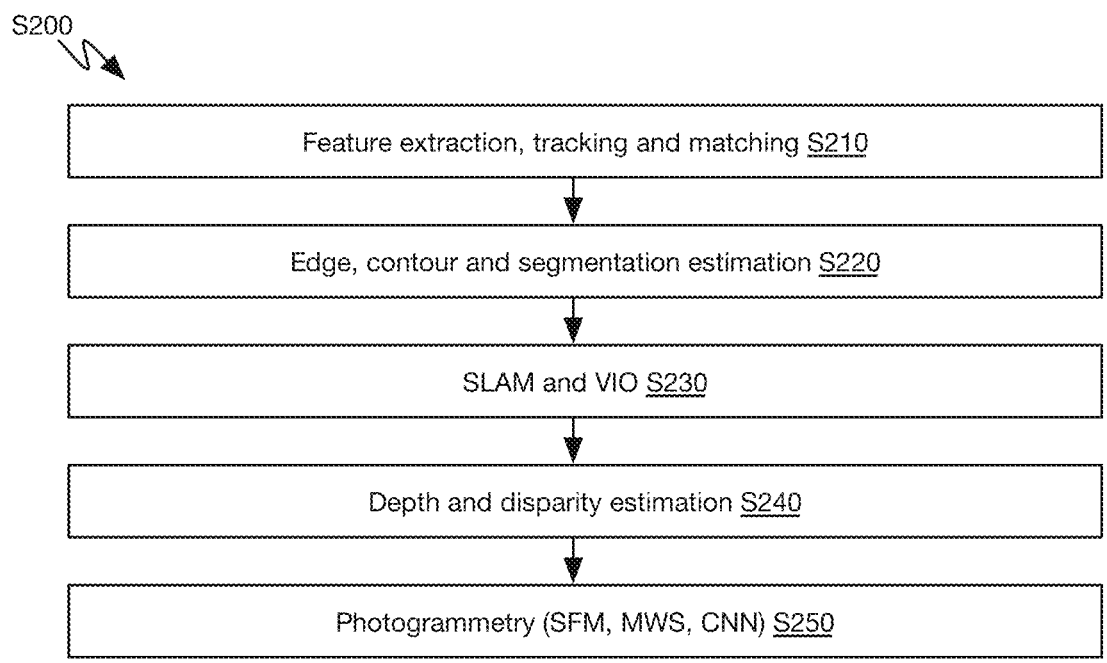
Figure 1D:

In variants, the method includes estimating visual information from each image S200, which functions to determine features that can be used in subsequent processes. S200 can include one or more of: identifying 2D image features in each image and optional correspondences across images by performing feature extraction, tracking, and/or matching on each image (S210); identifying object boundaries and object classes in the image by performing edge, contour, and segmentation estimation (S220); identifying 3D image features by performing multiview triangulation using SLAM (and optionally VIO) processes (S230); estimating depths of pixels and depth edges included in the image (S240); and identifying 3D image features by performing at least one photogrammetry process (e.g., SFM, MVS, CNN) (S250), as shown in FIG. 1C.

Examples of features include keypoints; patches; blobs; edgels; line segments; edgemaps, such as an image representation that reflects the strength (e.g., binary, probability score, etc.) of an edge (e.g. edge point is labelled 1 and the other points are labelled 0 in the visual representation); contours (e.g., outline representing and/or bounding the shape or form of an object); segmentation masks (e.g., each mask can be associated with an object in the scene); point clouds (e.g., determined by photogrammetry, depth sensors, etc.); geometries (e.g., relationships of points lines, surfaces, etc.); semantics (e.g., correlating low level features such as colors; gradient orientation; with the content of the scene imagery such as wall, window, table, carpet, mirror, etc.); planes; depth; and/or any other suitable visual information.

The visual information can include two-dimensional features, three-dimensional features, or additionally or alternatively neural network features or any other suitable features. The features can come from the set of images, subsets of images from the set, metadata associated with each image in the set of images, and/or from any other suitable source.

Two-dimensional features that can be extracted (at S210) can include pixels, patches, descriptors, keypoints, edgels, edges, line segments, blobs, pyramid features, contours, joint lines, optical flow fields, gradients (e.g., color gradients), learned features, bitplanes, and additionally or alternatively any other suitable feature. Two-dimensional features and/or correspondences can be extracted (e.g., using feature-specific extraction methods), read (e.g., from metadata associated with the image), retrieved data from the device, or otherwise determined. Two-dimensional features and/or correspondences can be extracted using one or more: feature detectors (e.g., edge detectors, keypoint detectors, line detectors, convolutional feature detectors, etc.), feature matchers (e.g., descriptor search, template matching, optical flow, direct methods, etc.), neural networks (e.g., convolutional neural networks (CNN), deep neural networks (DNN), recurrent neural networks, generative neural networks, etc.), object detection (e.g., semantic segmentation, region-based segmentation, edge detection segmentation, cluster-based segmentation, etc.), and any other suitable method for extracting and matching features.

In one variation of correspondence identification in S200, if a camera's intrinsics matrix and gravity vector estimate is available for an image (e.g. from inertial sensors in camera, from vanishing point estimation, from neural networks, etc.), then the vertical vanishing point can be estimated. The vertical vanishing point indicates the direction that all 3D vertical lines in the scene should be pointing. Then, for every point in an image, a vertical reference orientation (pointing from an image point to the vanishing point) can be compared for all images. This can aid in feature matches, by only matching features that also have matching vertical orientation in each image, but can aid in any other suitable manner.

In a second variation of correspondence identification in S200, if a gravity vector estimate is available for an image (e.g. from inertial sensors in camera, from vanishing point estimation, from neural networks, etc.) it can be used to add artificial, 3D plausible lines in the images by constructing a gravity-oriented 3D projected line through an image point and the calculated vanishing point. Generating such vertical lines uniquely across images can also be used to generate virtual line matches from point matches (e.g. gravity-oriented points), but can be used in any other suitable manner. However, correspondences (e.g., between features, objects, pixels, etc.) can be identified in any other suitable manner.

S200 can include determining three-dimensional features (S210). The three-dimensional features can be determined based on: 3D features from visual-inertial odometry and/or SLAM, from multiple view triangulation of points or lines, from active depth sensors (e.g., depth data from time-of-flight sensors, structured light, LIDAR, range sensors, etc.), from stereo or multi-lens optics, from photogrammetry, from neural networks, and any other suitable method for extracting 3D features.

The three-dimensional features can be: captured, extracted, calculated, estimated, or otherwise determined. The three-dimensional features can be captured concurrently, asynchronously, or otherwise captured with the images. Three-dimensional features can include depth data. The depth data can be depth maps (e.g., sparse, dense, etc.), 3D meshes or models, signed-distance fields, point clouds, voxel maps, or any other suitable depth data representation. The three-dimensional features can be determined based on the individual images from the set, multiple images from the set, or any other suitable combination of images in the set. The three-dimensional features can be extracted using photogrammetry (e.g., structure from motion (SFM), multi-view stereo (MVS), etc.), three-dimensional point projection, or any other suitable method. Three-dimensional point projection can include determining image planes for an image pair using respective camera poses and projecting three-dimensional points to both image planes using camera poses, or any other suitable method.

Three-dimensional features that can be determined can include: three-dimensional camera poses (e.g., in metric scale), three-dimensional point clouds, three-dimensional line segment clouds, three-dimensional surfaces, three-dimensional feature correspondences, planar homographies, inertial data, or any other suitable feature. The planar homographies can be determined by estimating the homographies based on points and/or line matches (optionally enhanced by gravity), by fitting planes to 3D data, by using camera pose and/or rotation estimates, or otherwise calculated. However, S200 can additionally or alternatively include any other suitable elements performed in any suitable manner.

In one variation, S200 includes determining a depth map (sparse depth map) based on the set of images. This can include: computing disparity across images of the set (e.g., based on camera pose estimates), and estimating semi-dense depth from the disparity (e.g., using binocular stereo camera methods).

In a second variation, S200 includes determining a depth map, registered to the image, from a depth sensor.

In a third variation, S200 includes determining a semi-dense depth map using one or more photogrammetry techniques. This variation can leverage the camera pose priors (e.g., from the augmented reality engine, VIO, SLAM, etc.), video and/or still image frames, preprocessed images (e.g., from S300) point clouds (e.g., from AR, SFM, depth-from-disparity, MVS for sparse 3D reconstruction and pose estimation, etc.), to obtain sparse 3D data from photogrammetry. In one example, S200 includes optionally first registering the key photographic views, and then adding in video room scan data to maximize odds that key photographic views are covered. In a second example, S200 includes using AR outputs (e.g., worldmap, poses, etc.) and/or depth-from-disparity as priors or filters. However, the depth map can be otherwise determined.

In variants, S200 is performed by the platform (e.g., 220), but can additionally or alternatively be performed by the user device (e.g., 210), or by any other suitable system.

S200 is preferably performed after S100, but can additionally or alternatively be performed contemporaneously and/or at any other suitable time.

However, S200 can additionally or alternatively include any other suitable elements performed in any suitable manner.

4.3 Adjusting and Compositing the Set of Images into Scene Imagery S300.

In variants, in a case where a set of several images are obtained at S100, the method includes adjusting and compositing the set of images into scene imagery S300. S300 preferably functions to generate a photorealistic wide-angle image, but can additionally or alternatively improve image visual quality, rectify images, stitch images together (e.g., for subsequent analysis on the stitched-together image) (at S310 shown in FIG. 1D), and/or generate any other suitable image for any other suitable analysis or use. S300 preferably ingests the information from S100 and S200, but can additionally or alternatively ingest any other suitable information. S300 can include rectifying the images (S320 shown in FIG. 1D), stitching the images into composite panoramas (S310), improving the image appearance (S330 shown in FIG. 1D), but can additionally or alternatively process the set of images in any other suitable manner.

In variants, S300 is performed by the platform (e.g., 220), but can additionally or alternatively be performed by the user device (e.g., 210), or by any other suitable system.

S300 is preferably performed after S200, but can additionally or alternatively be performed contemporaneously and/or at any other suitable time.

Rectifying the images (S320) can include rotational rectification. Rotational rectification can function to correct camera orientation (e.g. pitch, yaw, roll, etc.) for a given image to improve appearance or reduce perspective distortion. Rotational rectification is preferably applied to each image of the set, but can additionally or alternatively be applied to a composite image, a subset of the images (e.g., all images except the reference image), a single image, or to any other suitable set of images.

Rotational rectification can be achieved by rotation-based homography warp of the image (e.g., raw image, globally aligned image, locally aligned image, final panorama, etc.) relative to a set of target rotations or target coordinate axes, or any other suitable method. The target rotations can be computed using extrinsic camera pose estimates, gravity vectors, vanishing point calculations, device sensors, or any other suitable method.

In a first example, rectifying the image includes: adjusting the pitch angle of camera to make vertical lines (which appear to slant in 2D due to converging perspective) closer to parallel (e.g., in the image and/or in the 3D model). In a second example, rectifying the image includes adjusting the roll angle of the camera to make the scene horizon line (or other arbitrary horizontal line) level. In a third example, rectifying the image includes adjusting angles or cropping to optimize field of view. In a fourth example, rectifying the image includes moving the horizontal & vertical components of the principal point of the image.

Gravity vectors can be useful to rectify images to identify angle of pitch and roll. In man-made built environments, floors commonly have surface normals in the gravity direction, and walls typically have surface normals orthogonal to gravity.

Gravity vectors can be estimated by multiple methods. In a first variation, the gravity vector is calculated from the phone orientation or camera orientation, during image capture (e.g., from phone IMU). In a second variation, the gravity vector is inferred from the images. In one example, the gravity vector can be inferred from vanishing point clustering methods applied to line segment features, present in the images. In a third variation, gravity directions can be estimated by trained machine learning methods. In a fourth variation, gravity directions are received from a user. However, the gravity directions can be otherwise determined. However, the images can be otherwise rectified.

Determining stitched panoramas from the set of images (S310) can include identifying correspondences between images, computing coarse warps for image alignment (e.g., based on correspondences or global parametric motion models, using constrained local warping, content-preserving warps, global shape anchors, etc.), computing local warps (e.g., locally moving, floating, or stretching local areas of the image to better align images, seam-carving and blending (e.g. to seamlessly combine portions of images), using slit-scan mosaicking, using novel view synthesis, using light field rendering, or additionally or alternatively include any other suitable process or combination of processes.

Determining stitched panoramas from the set of images can include blending, cropping, or otherwise modifying the images. Blending can include removing any visible edges when compositing the seam-carved images and/or blending pixels from overlapping images. Blending can be done in the image domain, the gradient domain, the frequency domain, or other formulations. The blending can additionally or alternatively include image normalization. Cropping can include making the final panorama rectangular for the desired horizontal and vertical field of view (e.g., according to a predetermined size, shape, etc.), and/or repositioning (e.g. centering) the principal point in one or two dimensions.

In one variation, S300 can include applying one or multiple pixel motion models to complete images or to partial images, which can function to coarsely (i.e. approximately) align an image with other images in the set of images and/or to the currently aligned panorama being created. The outputs of the pixel motion models can be used to: find feature correspondences (e.g., wherein features are matched using the bulk-associated pixels); compute coarse warps (e.g., to find the coarse alignments); or otherwise used. The pixel motion models preferably ingest an image of interest and a reference image (e.g., both of which can be from the image set), or can use any other suitable set of inputs (e.g., camera motion parameters, etc.). The pixel motion models preferably output global or semi-global mappings that bulk associate pixels in the image to the target, but can additionally or alternatively output motion parameters (e.g., parametric motion parameters), or output any other suitable set of parameters. For example, S300 may use one or multiple pixel motion models including: homography warps, affine warps, rotational warps, translational warps, optical flow fields, depth-layered warps, novel-view synthesis, or any other suitable coarse-alignment technique. However, the pixel motion models can include local mappings, pixel-to-pixel associations, or any other suitable model.

Figure 12:
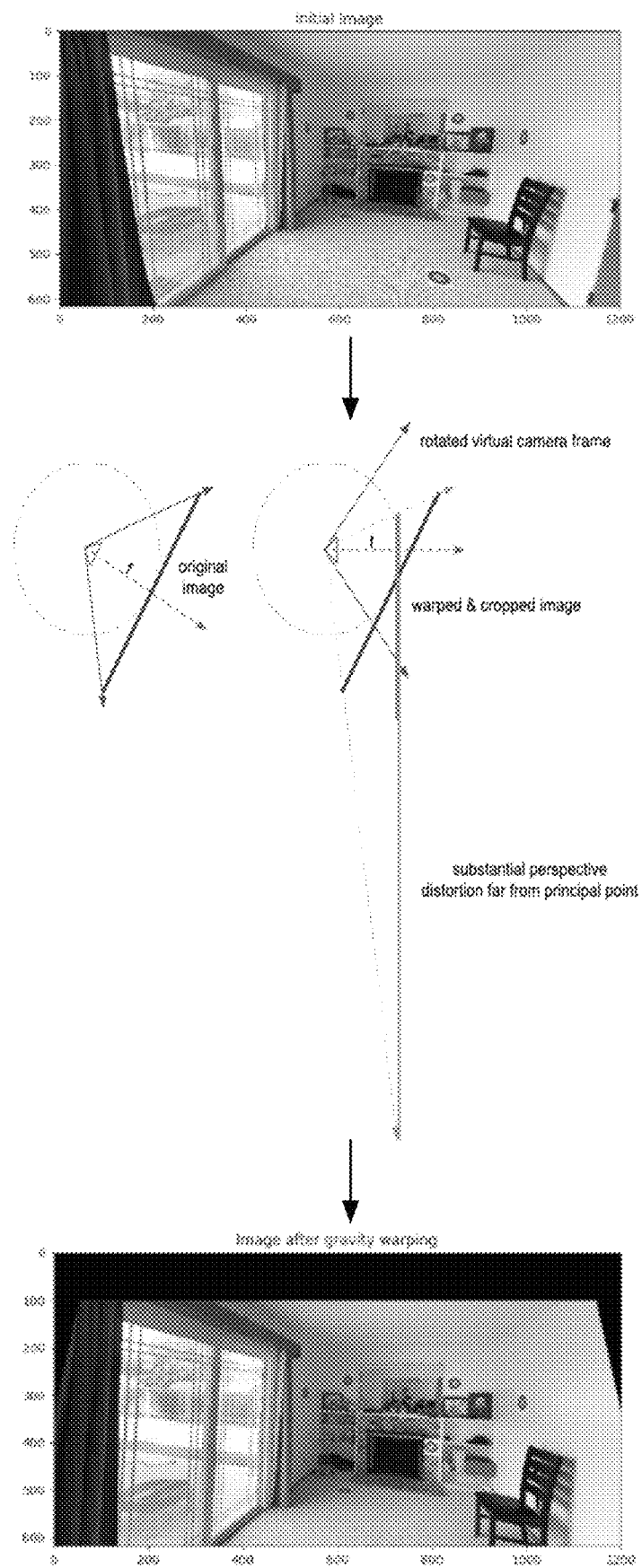
FIG. 12 is a variant of S300.

An example of S300 is depicted in FIG. 12.

However, S300 can additionally or alternatively include any other suitable elements performed in any other suitable manner.

4.4 Estimating dense 3D Model and Semantics of the Scene Imagery S400.

Figure 1E:
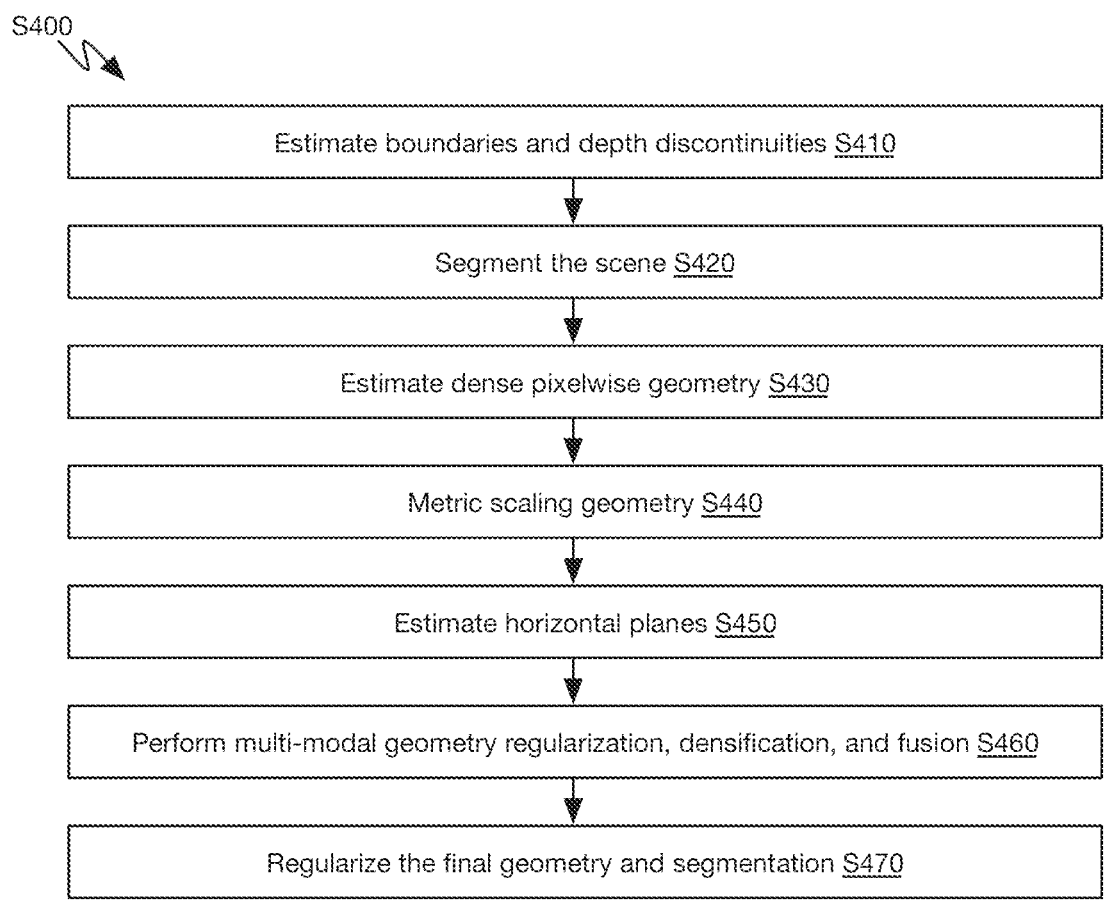

In variants, the method includes S400, estimating dense 3D geometry, surfaces, and fine segmentation of the scene imagery. S400 preferably functions to determine fused metric depth map, architectural surfaces, and enhanced segments, but can additionally or alternatively determine any other suitable information. In variants, S400 includes one or more of: estimating boundaries and depth discontinuities S410; segmenting the scene S420 (e.g., performing multi-scale scene segmentation); estimating dense pixelwise geometry S430; metric scaling geometry S440; estimating horizontal planes (e.g., floors and table tops, etc.) S450; performing multi-model geometry regularization, densification, and fusion S460; and regularizing the final geometry (including planar surfaces such as walls) and segmentation S470, as shown in FIG. 1E. However, S400 can include any other suitable processes. S400 is preferably performed after S200 and/or S300, but can additionally or alternatively be performed contemporaneously with S300, and/or at any other suitable time.

In variants, S400 is performed by the platform (e.g., 220), but can additionally or alternatively be performed by the user device (e.g., 210), or by any other suitable system.

Estimating boundaries and depth discontinuities S410 preferably functions to estimate edges of objects (included within an image obtained at S100 or composited at S300), which can subsequently be used to guide semantic segmentation, to correct edges in the depth maps or point clouds (e.g., the dense depth map; sparse depth map; dense, scaled depth map, etc.), or otherwise used. S410 can be performed before S420, but can additionally or alternatively be performed at any other suitable time. S410 preferably determines edges based on information from S100-S300 (e.g., object information, metric scale information, metadata, visual information, depth discontinuities, extracted features, the raw set of images, pre-processed images, etc.), but can additionally or alternatively determine edges based on any other suitable set of data. The resultant edgemaps (generated by estimating edges of objects) are preferably associated with (e.g., aligned with) pixels from the raw image set (e.g., obtained at S100), but can additionally or alternatively be associated with point cloud or depth map points (e.g., in the sparse depth map, dense depth map, etc.) or any other suitable datum. S410 can determine estimates of edges of objects using one or more methods. Examples of methods that can be used to determine estimates of edges of objects include: 2D image gradient techniques (e.g., Canny edge detector, Sobel derivatives, Laplacians, line segment detectors such as LSD, MCMLSD, EDLines, etc.); neural network based line detection algorithms; neural network based wall seam and architectural edge detection algorithms; neural network based contour detection algorithms using disparity maps and/or depthmaps to identify regions likely to have sudden change in depth (i.e., depth discontinuity), optionally refining the maps/depth edges using RGB image information; using multi-scale variations of the aforementioned techniques; and/or any other suitable process.

Figure 11:
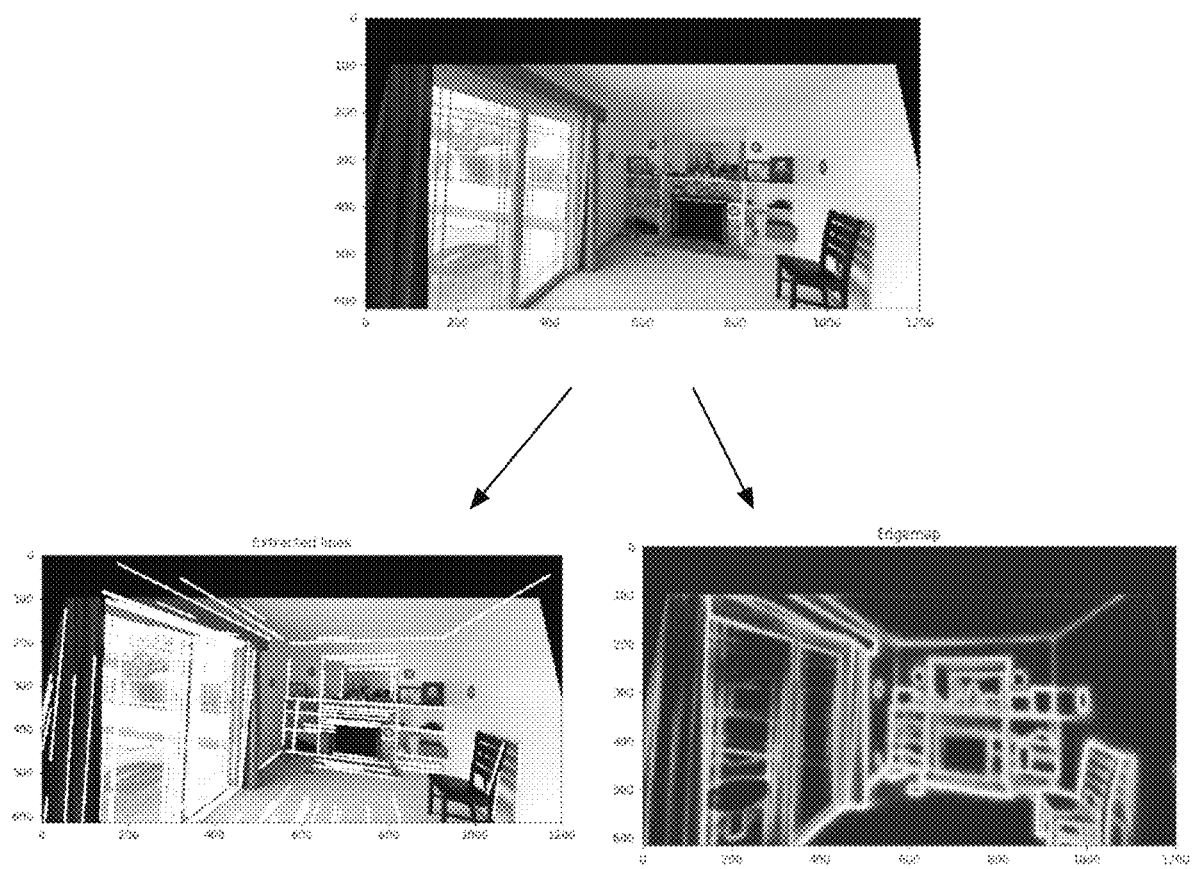
FIG. 11 is an example of S400.

An example of object edges estimated at S410 is depicted in FIG. 11.

However, S410 can additionally or alternatively include any other suitable elements performed in any other suitable manner.

Segmenting the scene S420 preferably functions to determine semantic probabilities for each of a set of pixels, and can optionally determine edges for each identified object. Segmenting the scene (S420) can include generating a semantic segmentation map that can be used to: refine edge depth in the dense, scaled, fused depth map; generate object masks; and/or be otherwise used. S420 preferably functions to output fused ensemble semantic probabilities (e.g., by chaining multiple semantic segmentation techniques) but can additionally or alternatively perform any other suitable set of functionalities. In some implementations, scene segmentation is performed by performing at least one semantic segmentation process (e.g., using a classifier, a neural network, a convolutional neural network, an ensemble of classifiers, a tree classifier, etc.). S420 is preferably performed after S410, but can additionally or alternatively be performed at any other suitable time. S420 is preferably performed using the raw image set (e.g., obtained at S100), but can additionally or alternatively be performed using: the edgemap (e.g., generated S410), the depth maps (e.g., dense depth map, sparse depth map), the pre-processed image (e.g., generated at S300), and/or any other suitable data. In one example of S420, S420 can include: using multi-scale segmentation, using edgemap fusion (e.g., probabilistic perceptual edges for spatial-weighting), using CRF and other edge enhancement, and/or using depth estimates to improve segmentation, but can additionally or alternatively include using any other suitable method.

In a first variation, S420 includes segmenting objects appearing in the scene captured by the raw image set (obtained at S100), and determining a class (and/or a class probability) for each of pixel forming the segments.

In a second variation, S420 can include a multi-scale ensemble scheme to achieve both fine pixel segmentation (using at least one high resolution version of the image(s) and edge probabilities) and classification robustness (using at least one lower resolution version of the image(s)). An example of S420 can include: down-sampling the images from the raw image set based on a set (e.g., pyramid configuration) of down-sampling thresholds (e.g., choosing 1 pixel per 5×5 pixel region, wherein regions have no overlap, choosing 1 pixel per 10×10 pixel region, etc.) to generate a set of different-resolution versions of the image (segmentation images). Each segmentation image is then processed by one or more of the same or different semantic segmentation classifiers to obtain edge values and/or object classes for each pixel in the respective image. The results of the multiple semantic segmentation processes are then merged by prioritizing the edge values from higher-resolution images and prioritizing the class values from lower-resolution images. In one example, for each pixel in an image, a probability score for each object-class is organized in a vector. A weighted score vector can be determined for a pixel by multiplying (elementwise) the vector of probability scores (for that pixel) by a vector of weights (wherein each weight can be the same, the weights can be different, the weights can be based on information associated with the thresholds and/or otherwise determined). Each weighted score vector can be combined (e.g., addition, multiplication, etc.) to determine a combined vector. The entry in the combined vector with the highest value can be determined to be the object-class of the pixel.

In a third variation, the per pixel object-classes can be combined to obtain object masks (e.g., each pixel associated with an object class can be combined to form a single object mask).

Figure 5:
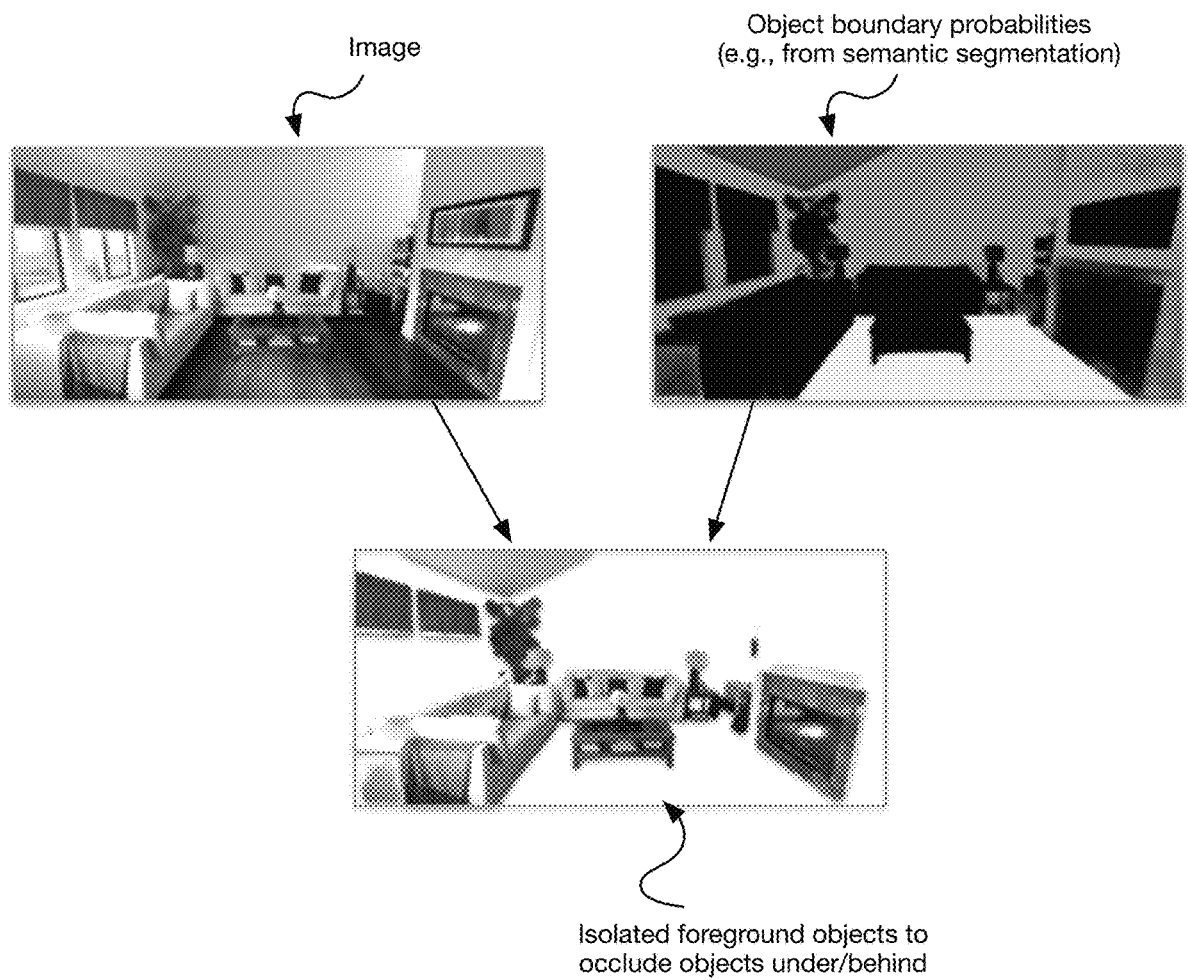
FIG. 5 is an example of S400.
Figure 13:
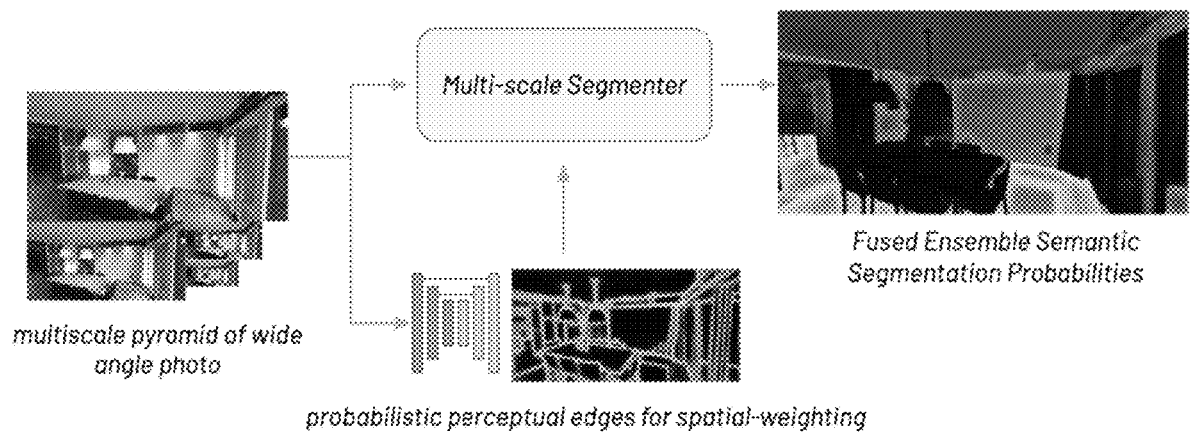
FIG. 13 is an example of S400.

An example of S420 is depicted in FIGS. 5 and 13.

However, S420 can additionally or alternatively include any other suitable elements performed in any other suitable manner.

In variants, estimating dense pixelwise geometry S430 functions to determine a dense depth map for the image (e.g., obtained at S100, composited at S300, etc.). Additionally, or alternatively, estimating dense pixelwise geometry S430 functions to determine a point cloud for the image. This dense geometry preferably includes a depth estimate for each pixel (or a depth estimate for a threshold proportion of the pixels in a given image or image set, e.g., more than 50%, 60%, 70%, 90%, etc.). In some implementations, the determined depth estimates can be inaccurate and/or unsealed. Additionally or alternatively, the dense geometry can be accurate and/or scaled. S430 can be performed using: the raw image set, the auxiliary data, and/or any other suitable input. In one variation, the images and/or image segments can be one or more crops from the images determined in S100 (optionally warped-rotated) (e.g., to feed into estimation algorithms such as neural networks, regressions, nearest neighbors, etc.), which can for example function to allow images of the wrong dimensions to match neural network input tensors, and/or to provide multi-scale invariance and improved stability, but can additionally or alternatively provide any other suitable set of functionalities.

Estimating dense pixelwise geometry (e.g., estimating depth estimates for pixels in the image) at S430 is preferably performed using one or more neural networks, but can be otherwise performed. Examples of the neural networks include: single-view (monocular) depth and normal neural networks, two-view (stereo) depth and normal neural networks, and multi-video depth and normal neural networks. In some variations, depth estimates for pixels are estimated from semi-dense data generated by performing at least one of a depth-from-disparity process and a multiview stereo process. Additionally, or alternatively, depth estimates for pixels are estimated from semi-dense data generated from hardware depth sensors. However, any other suitable method can be used to generate semi-dense data for estimating depth of pixels in the image being processed at S430. In one example, S430 fuses multiple semi-dense and dense depth estimation techniques to determine depth maps of the images and/or image segments of S100 or S300. S430 is preferably performed contemporaneously with S420, but can additionally or alternatively be performed before, after, or at any other suitable time.

In one example, S430 uses a depth estimation network that internally optimizes depth and normal priors from S250 to improve geometry estimation. However, dense pixelwise geometry can be otherwise estimated.

However, S430 can additionally or alternatively include any other suitable elements performed in any other suitable manner.

The method can include S440: metric scaling the dense geometry (e.g., generated at S430). In variants, the 3D geometry output by S200 is scaled at S440. Additionally, or alternatively, the depth map output at S430 is scaled at S440. However, any other suitable 3D geometry can be scaled at S430. In variants, at S440, the depth map is scaled based on metric scale information captured with the image set (at S100). Additionally, or alternatively, the depth map can be scaled based on cloud-based visual-inertial odometry, information identifying detected objects with known scale (and depth) within the scene, manual measurements, or any other suitable type of data or information. Scaling of the dense geometry (at S440) can be performed contemporaneously with S430, after S430, and/or performed at any other suitable time.

In a first variation of S440, the dense depth map (generated at S430) is scaled using metric scale information (e.g., metric scaled point cloud, metric scaled planes, etc.) captured with the image set (at S110). In some implementations, the metric scale information is filtered using statistics, estimated geometry and segmentation data to remove outliers and noise.

In a second variation of S440, the dense geometry (generated at S430) is scaled using a pre-scaled sparse (photogrammetry) depth map (e.g., generated at S200). In some implementations, the photogrammetry depth map (e.g., generated at S200) is scaled using metric scale information captured with the image set (at S110). In some implementations, metric scaling the geometry (at S440) functions to fuse the metric scale information (e.g., point cloud) with the photogrammetry point cloud, but can additionally or alternatively provide any other suitable set of functionalities.

In some implementations, the dense depth map generated at S430 is scaled at S440.

Scaling at S440 (for either of the photogrammetry depth map generated at S200, or the dense depth map generated at S430) can include one or more of: using a visual-inertial SLAM/AR sparse point cloud and interpolation to assign metric scale to photogrammetry point clouds/reconstructions; using a visual-inertial SLAM/AR sparse point cloud and mesh densification (e.g., Delaunay triangulation, Poisson filtering, least-squares filtering, etc.) to propagate metric scale to photogrammetry point clouds (or reconstructions); using visual-inertial SLAM/AR sparse point clouds and dense neural network depth estimates to propagate metric scale to photogrammetry point clouds (reconstructions); using visual-inertial SLAM/AR metric pose estimates to fuse metric scale information with photogrammetry, such as by determining a best-fit scaling (or metric scaling factor) for poses (e.g., determining a best fit similarity transform by determining rotation and translation between photogrammetry pose estimates and/or visual-inertial SLAM/AR pose estimates) and aligning photogrammetry pose estimates to visual-inertial SLAM/AR pose estimates (e.g., to determine a metric scaling factor); using detected planes from AR and/or segmentation (e.g., from neural networks; clustering algorithms, histogram-based methods, and/or any other suitable method) to infer metric scale; and/or using visual-inertial SLAM/AR (sparse) point clouds and/or floor segmentation to align/scale floor planes to photogrammetry point clouds/reconstructions; using metric scale depth estimates from depth sensors (e.g. depthmaps from ToF or structured light sensors) to improve geometric scale; using metric scale depth estimates from stereo or multi-lens cameras to improve geometric scale; using known object detection to improve geometric scale; using fiducial markers to improve geometric scale; and using user-input measurements or adjustments to improve geometric scale. However, any suitable process can be used to perform scaling at S440.

In a first example, scaling at S440 includes: scaling a point cloud by using a height estimate. The height estimate can be a floor-plane height estimate. The height estimate can be a high quality, metric-scale height estimate. The height estimate can be determined from visual-inertial odometry, AR platform, range sensor, fiducial marker, or any suitable process. The point cloud can be a photogrammetry point cloud, a dense point cloud, or any suitable type of point cloud. Scaling the point cloud can include scaling the point cloud with a scalar. Scaling the point cloud can function to make the height of the floor class points (point cloud points of a room's floor in a scene captured by the images(s) obtained at S100) consistent with the estimated floor plane height. The scaling can be performed by using a robust model fit (e.g. RANSAC, median scaling, etc.). In variants where the point cloud (e.g., photogrammetry point cloud, dense point cloud) is scaled using a high-quality floor plane estimate, the point cloud can optionally be refined or augmented by adding/replacing the depth of all pixels which are confidently segmented as an object class (e.g., floor) to and/or with the depth of the floor plane, but the photogrammetry point cloud can be scaled using any other suitable process. For example, if the depth of the floor is known, the estimated depths for all pixels associated with the floor (as determined by segmentation results generated at S420) are set to the depth of the floor. In some implementations, a depth is assigned to each segment identified during segmentation at S420, and pixels or points associated with a segment are assigned the depth of the segment. In this manner, rather than estimate, or determine, a depth for each pixel of a segment, a depth is determined for the segment, and this depth is assigned to each pixel or point related to the segment. In a specific example in which a segment is a planar surface, the depth of each pixel representing the planar surface is estimated based on the geometry of the planar surface, such that the estimated depths for each pixel of the surface all lie within a same flat geometric plane.

In a second example, scaling at S440 includes: using adjacent SLAM/AR map points (which overlap or are nearby to the points within the photogrammetry or dense point cloud) to scale the point cloud such that the point cloud's points best agree with the adjacent SLAM/AR map points in the image(s) (e.g., from S100). S440 can optionally use interpolation/extrapolation methods to estimate values between sparse SLAM/AR points (e.g., using RANSAC, median scaling, ICP, and/or any other suitable model).

In a third example, scaling at S440 includes: scaling the photogrammetry point cloud by fitting a similarity transform to the camera pose positions of the photogrammetry and/or AR point clouds, finding the optimal transform (e.g., that best makes the poses agree, that is optionally robust, that is optionally tolerant of outliers, etc.) and applying the transform to the photogrammetry point cloud, a subset of points of the photogrammetry point cloud, and/or any other suitable point cloud.

In a fourth example, scaling at S440 includes: computing a scaling factor from metric scale camera poses (e.g. from SLAM/AR) and photogrammetry poses. Determining scale from photogrammetry poses and metric poses can include computing baseline distances for the photogrammetry poses (e.g. from an arbitrary reference pose index), computing baselines for the metric poses (e.g. from the same reference pose index), determining scale ratios by scaling the baselines of the metric poses by the baselines for the photogrammetry poses (e.g., using element-wise division), and robustly determining the best scaling factor that brings the photogrammetry poses into conformance with the SLAM/AR metric poses (e.g. rejection extreme outliers, robust averages, RANSAC, etc.).

In a fifth specific example of S440, global scale can be determined by robustly computing a global scalar that causes the metric points (e.g. from visual inertial SLAM/AR, etc.) to best fit with the estimated geometry. Determining a global scalar that best fits metric points to geometry can include: robustly determining global scalar from overlapping (or nearly overlapping) portions of photogrammetry depth maps and metric depthmaps; robustly determining global scalar from projecting and intersecting metric points onto interpolations and/or extrapolations of sparse geometry (e.g. Delaunay tesselation, least-squares meshing, neural network interpolation); robustly determining global scalar from projecting and intersecting metric points onto dense reconstructions.

In a sixth example of S440, scaling is restricted to certain points, pixels or segmentation classes (e.g. only use floor points, only use high-confidence points, avoid mirrors or reflective surfaces, avoid objects behind windows, avoid distant points, etc.).

In a seventh example of S440, global scale can be determined by detecting heights of objects based on detecting known objects in an image and obtaining the height based on a predetermined height (or set of heights) of the known object (e.g., retrieved from a database).

In an eighth example of S440, global scale can be determined by determining the height of the camera from the floor plane the photographer is standing on based on the heights of known objects in the image calculated using single-view odometry using gravity (see FIG. 7), an average camera height (e.g., 1.43 meters, 4.7 feet, 5 feet, etc.), and/or determined in any other suitable manner; determining planes or parameters thereof (e.g., height) based on user input (e.g., fine tuning) where the user adjusts a floor height to define the height (e.g., based on visual cues) or drags a virtual marker to define the corners and/or edges of the floor or wall; and/or determining planes based on user input (e.g., manual measures) where the user can mark a vertical floor height for a known height in the image; but can additionally or alternatively include any other suitable process. The process can be a single process, a set of chained processes (e.g., executed sequentially) and/or suitable process.

Figure 6:
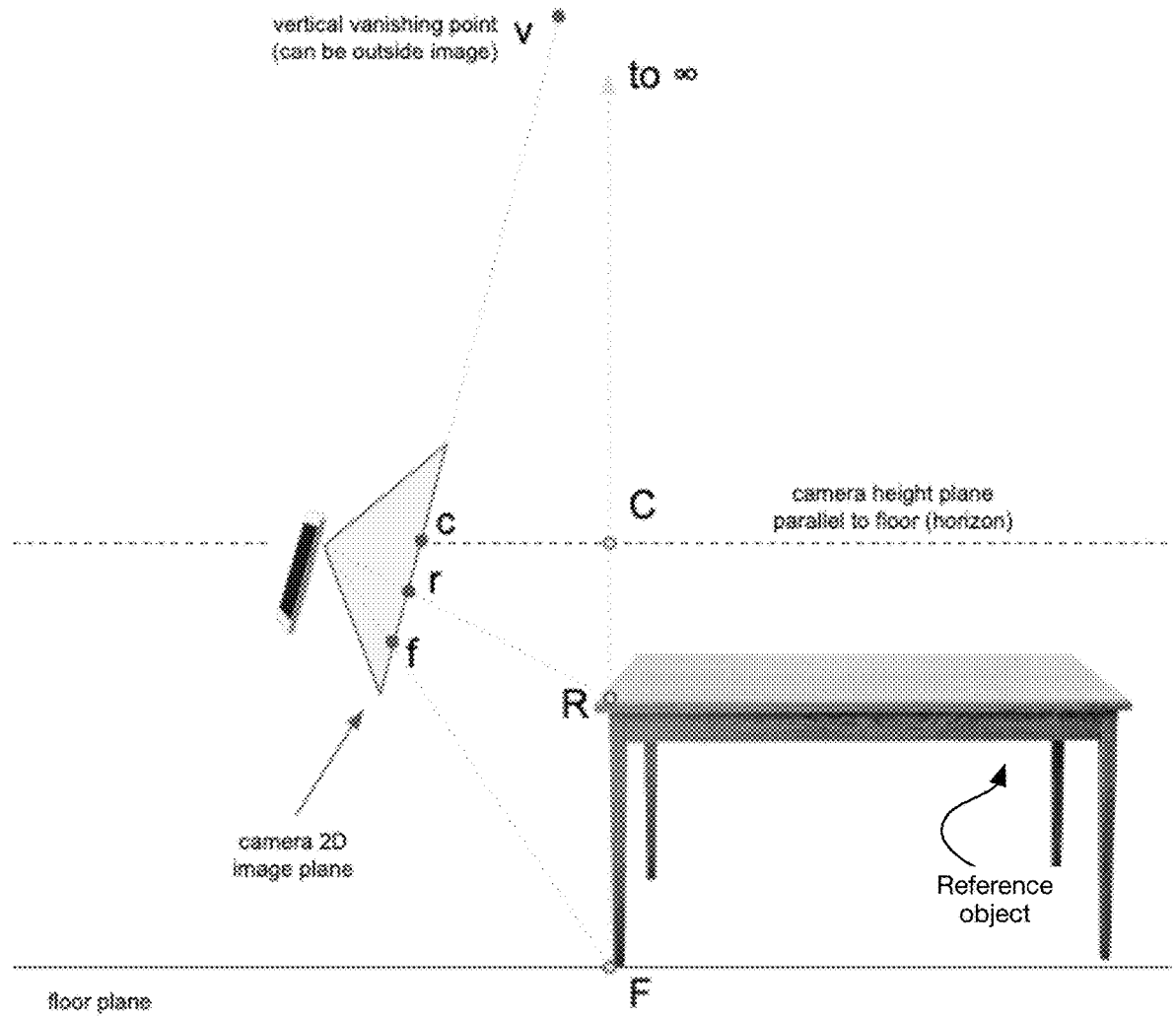
FIG. 6 is an example of S400.
Figure 7:
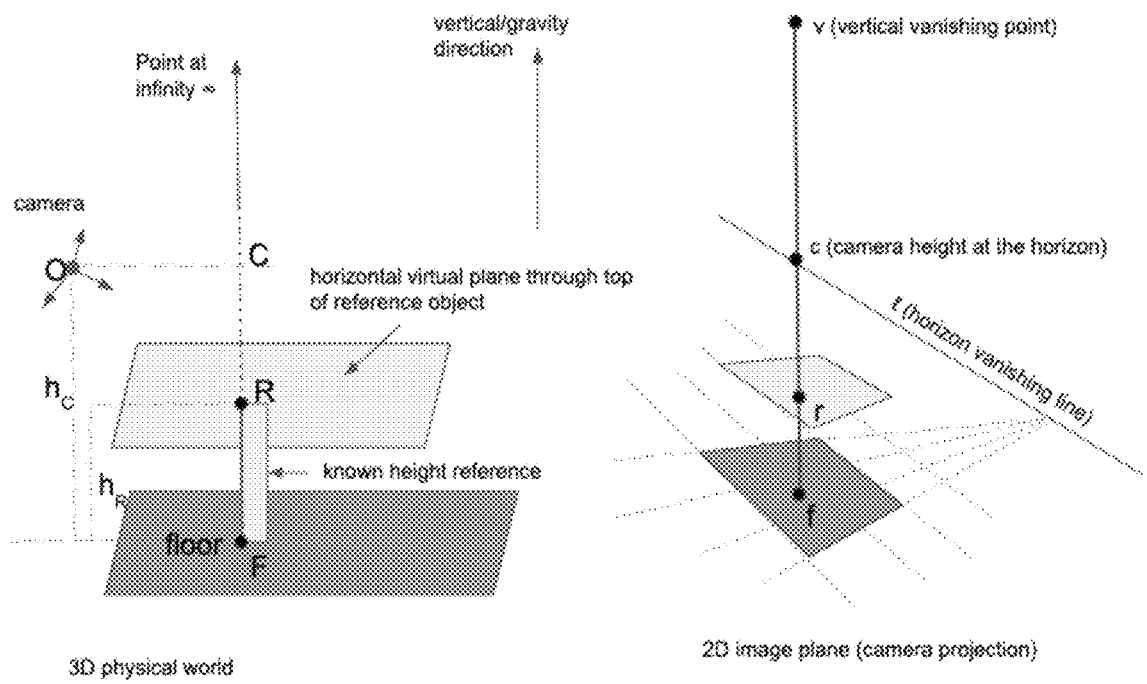
FIG. 7 is an example of S400.

A specific example of estimating camera height above floor from known objects is illustrated in FIGS. 6 and 7, wherein the camera height is estimated from a measured height from a reference object to the floor (RF) using gravity, vanishing points, and projective geometry. In variants, this includes computing the camera to floor height ("$h_c$") based on a known reference object height ("$h_r$") (e.g., using cross ratios) where the vanishing line and the vanishing point can be determined based on the plane normal of the (x-z) plane parallel to the floor (e.g., gravity). In a specific example, the camera height can be computed using the following equation:

$$\frac{h_R}{h_C} = 1 - \frac{d(v, f) \cdot d(c, r)}{d(v, r) \cdot d(c, f)}$$

where v is the vertical vanishing point, f is the floor point aligned with v, c is the camera height at the horizon, r is a point on the horizontal virtual plane extending through the top of the reference object aligned with f and v, and d(x,y)

can be the distance between the x and y points. However, any other suitable equation can be used. In an example, two pixel projections of the end points of a vertical line segment of a reference object, which should pass through vertical vanishing point "v" and intersect the horizon vanishing line at "c" as shown in FIG. 7.

However, S440 can additionally or alternatively include a combination of the above and/or any other suitable elements performed in any other suitable manner.

S450 preferably identifies horizontal planes (e.g., floors), but can additionally or alternatively identify vertical planes (e.g., walls) and/or any other suitable plane. S450 can optionally determine heights, surface normal, orientation, and/or any other suitable plane information. S450 can be performed contemporaneously with S440, after, and/or at any other suitable time. The planes can be determined based on: neural network surface normal and/or plane estimators, auxiliary information (e.g., AR detected planes, AR point planes, gravity measurements, etc.), plane fitting to point clouds or depth map(s), semantic segmentation map, fiducials, manual labels, and/or any other suitable input. The planes can be determined using: trained machine learning models, heuristics, histogram searching, RANSAC, robust model fitting, plane-fitting, and/or any other suitable method or combination thereof (e.g., cascade, voting).

In some examples, estimating planes (at S450) includes one or more of: using planes detected by an AR (Augmented Reality) platform (e.g., included in the user device 210 of the system 200, included in the platform 220 of the system 200, shown in FIG. 2); estimating planes by using robust fitting of line, point, class and/or surface normal features; determining horizontal planes by first orienting a reference axis parallel to gravity (e.g. the Y axis of AR systems is often defined as -gravity) and then using histograms of the gravity-aligned component of 3D points, where the peaks indicate horizontal planes; determining horizontal planes based on fitting planes to point clouds with a surface normal parallel to the gravity vector (e.g., using histogram search, RANSAC, search, and/or any other suitable model fit); determining floor planes by filtering point clouds for points labeled as semantic floor classes, before horizontal plane fitting; determining horizontal and/or floor planes using a trained neural network that determines plane regions and plane equations; determining architectural boundaries (e.g., floor, wall, ceiling, etc.) based on floor/wall/ceiling points near wall seams, near chair legs, near sofa boundaries, and/or based on any other suitable set of points; handling noise and unreliable points by determining point confidence weighting, which can be achieved by determining the number of views the point was visible, reprojection error/variance, closeness to a wall boundary, closeness to a depth occlusion (photogrammetry methods can cause false depth overhangs), local intensity variance across images, and/or using any other suitable process; and determining normal vectors and depths based on recognizing special markers (e.g., fiducials) on horizontal surfaces.

However, S450 can additionally or alternatively include any other suitable elements performed in any other suitable manner.

In variants, performing multi-model geometry regularization, densification, and fusion at S460 includes combining data to determine a fused depth map for the image (e.g., obtained at S100, generated at S300). In some implementations, the fused depth map is a dense, accurate, scaled depth map. In some implementations, combining data to determine the fused depth map includes: combining output generated by multiple models and available depth estimates. In some implementations, the available depth estimates include one or more of: depth estimates included in the photogrammetry point cloud, depth estimates included in the neural network dense depth map, depth estimates included in the AR sparse depth map, depth estimates included in depthmaps, depth estimates included in plane equations, and the like. S460 can be performed contemporaneously with S450, after S450, and/or at any other suitable time relative to S430, S440, and/or S450.

In variants, performing multi-model geometry regularization, densification, and fusion at S460 includes one or more of: determining a fused depth map by fusing the photogrammetry, neural geometry and/or AR point clouds (e.g., use the dense depth map's estimates to fill gaps in the photogrammetry and/or AR point clouds); filtering (local) outliers in MVS data (e.g., during the process of fusing the photogrammetry, neural geometry and/or AR point clouds); and densifying the point clouds (e.g., using Delaunay triangulation, Poisson meshing, LS filtering, bilateral filtering, domain transfer filtering, etc.). In some implementations, S460 includes performing local error correction and/or space filling for the fused depth map by using least squares meshes. In some implementations, meshes are used as an interpolation mechanism for depth and/or delta depth for tight local error correction or space filling, and/or for any other suitable functionality.

In one example of S460, fusing the photogrammetry point cloud with the neural depth map includes one or more of: removing outliers by filtering and averaging the depths of the photogrammetry point cloud; adding additional pseudo depth points (e.g., from the scaled neural depth map) around the perimeter of the image (e.g., so that the convex hull of the photogrammetry point cloud contains the whole image and/or for any other suitable benefit) where the pseudo depth points can optionally be spaced around the perimeter of the image (e.g., distal regions with real photogrammetry points, proximal regions with real photogrammetry points, etc.); optionally applying densification/meshing/interpolation/extrapolation techniques to densify sparse data (e.g., using methods including 2D Delaunay triangulation interpolation, Poisson filter mesh, least squares meshing, and/or any other suitable process); fusing depth data (e.g. neural depth data) with sparse depth data (e.g., photogrammetry point cloud, AR point clouds, etc.) by filling in gaps in the sparse depth data with the dense depth data; and regularizing the resultant depth map (e.g., by segmentation classes, normal, and/or other priors) to output a fused, dense depth map. However, S460 can be otherwise performed.

In a specific example, S460 can use 2D Delaunay triangulation of photogrammetry data as an interpolation mechanism for depth for tight local error correction and space filling of neural dense depth data. The 2D Delaunay triangulation algorithm can include one or more of: filtering outliers of the photogrammetry depths, generating 2D Delaunay triangle meshes based on MVS points (semi-dense), computing delta depths between the photogrammetry depths and the neural depths on the triangular vertices (e.g., by, on a 2D image, determining the difference between the photogrammetry depth and the neural depth), interpolating the sparse delta depths based on local triangles and/or perspective correction techniques; and combining the interpolated delta depths and the neural depths (e.g., by adding) to obtain the corrected depth map.

In a second example, S460 can use energy-minimizing meshes such as Least-squares meshes and Laplacian meshes to refine a dense depth map by steering the depth map locally toward sparse photogrammetry anchor depths while preserving the local shape relationship of the dense depth. S460 can additionally or alternatively include any other interpolation and/or optimization mechanism for fusing dense neural depths with sparse depths and/or provide any other suitable set of benefits.

However, S460 can additionally or alternatively include any other suitable elements performed in any other suitable manner.

In variants, regularizing geometries and segmentation S470 functions to jointly improve geometry (including planar surfaces) and segmentation. In many cases, segmentation can be used to improve geometry, and geometry can be used to improve segmentation. S470 can regularize the geometry using: a segmentation map (e.g., by regularizing geometries within the same segment), normal maps, planes (e.g., from S450), depth sensor data, VIO (Visual Inertial Odometry) outputs, depth maps (e.g., from S460, S430, S440, etc.), and/or any other suitable data. Regularizing geometries and segmentation (S470) can include using energy-based optimization, filtering, heuristics, and/or any other suitable method to determine regularized geometry and/or segmentation. S470 can be performed after, before, and/or contemporaneously with S460, and/or at any other suitable time.

In one example, S470 includes regularizing walls to improve their surface normal accuracy (e.g. vertical walls should be orthogonal to the floor plane) and uniformity (e.g. flatness). Regularizing walls can be determined based on multiple sources of representational data such as from SFM (structure from motion) & MVS (multi-view stereo) photogrammetry, neural networks, architectural seams, vanishing points, gravity, plane equations, semantic segmentation, and/or any other information. The regularization can be modelled as an energy-minimization optimization and solved using linear or variational methods.

Figure 8:
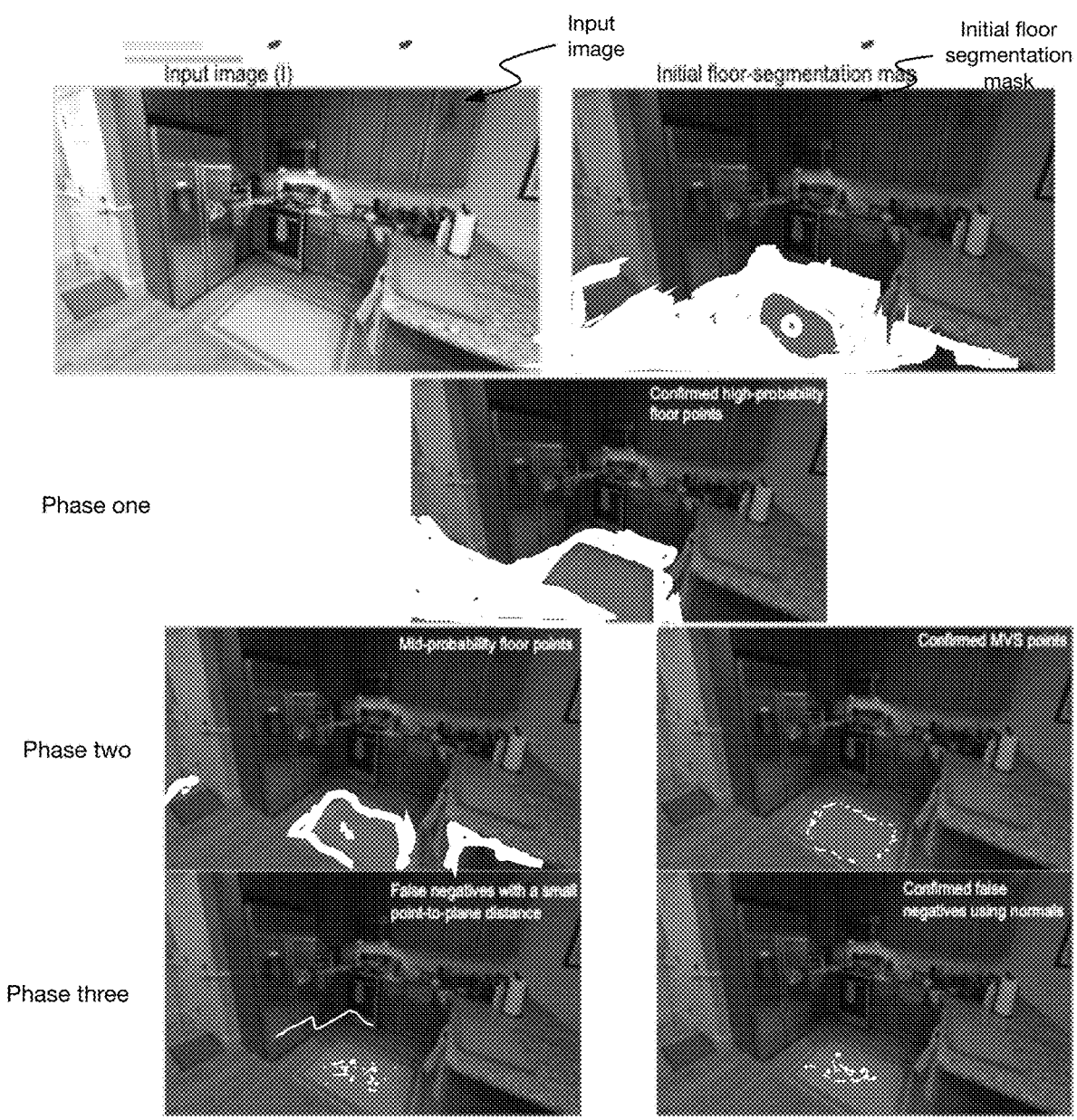
FIG. 8 is an example of S400.

In a second example, S470 can include regularizing semantic segmentation data using color images, segmentation maps, depthmaps and/or point clouds, and normal maps. The regularization can reduce false negatives and false positives in segmentation by using plural modalities such as normals, 3D depths and/or point cloud of the scene. As illustrated in FIG. 8, floor pixels mis-segmented as not-floor can be corrected using the class probability and likelihood that class would have local depths and normals as observed.

In one example, the refinement algorithm can include three passes. The first phase (e.g., FIG. 8) can include: determining high probability points p (e.g., probability(p)>0.9) using a point-to-plane distance, given a 3D estimated floor plane and a probability map of segmented floor points. A threshold over Euclidean distance can be used. Depth of confirmed points can be refined using the computed point-to-plane distance difference. However, the first phase can additionally or alternatively include any other suitable process.

The second phase (e.g. FIG. 8) can process the mid-probability points (e.g., p (0.5<probability(p)<0.9)). A voting scheme can be applied to refine the floor-labels as follows: using MVS, compute, for each point p within a search window, the distance to the detected floor plane and/or the normals deviation using the floor's estimated normal. If both conditions are satisfied, point p can be attributed a vote. If point p holds enough votes (above a threshold), it is then confirmed as a floor point; otherwise, it's assigned the label of its second highest probability segment. The search window can be adaptive depending on the sparsity/density of the inputs. Confirmed points' depth can be refined as described in the first phase. Optionally, in case of sparse points or in favor of time-processing, the refined label can be attributed as follows: (a) cluster the mid-probability points using normals; (b) for each cluster, if the sum of received votes is significant, then assign the cluster a floor label; else, assign its second highest predicted label.

In the third phase (e.g. FIG. 8), non-floor labeled points can be processed. A similar voting scheme as described in phase two can be implemented for non-floor labeled points. Points/pixels are corrected using a search window: if significant window-pixels are confirmed as a floor-point, then the current pixel's label can be labeled as floor. Otherwise the initial predicted label can be retained.

The transformation can additionally or alternatively include any other suitable process/phase, and/or be applied to other object classes.

However, S470 can additionally or alternatively include any other suitable elements performed in any other suitable manner.

However, S400 can additionally or alternatively include any other suitable elements 4.5 Computing Foreground Occlusion Masks and Depths for the Scene Imagery S500.

S500 preferably functions to determine foreground occlusion masks and/or depths for the scene imagery (e.g., for each of a set of objects appearing in the scene), but can additionally or alternatively perform any other suitable set of functionalities. In variants, several occlusion data assets are generated for the image being processed. These occlusion data assets can be used to render a scene at S600. In variants, the data assets can be used by a renderer to render (e.g., in real time) virtual objects onto a real scene, and perform occlusion (e.g., conditional occlusion) processing for virtual objects that overlap real objects in the rendered scene.

The data assets generated at S500 can include one or more of: photorealistic imagery 501; an object mask with clean depth edges 502; a dense depthmap that includes depth estimates for each pixel of the image being processed 503; and information identifying pixels that correspond to key geometric surfaces (e.g., walls, floors, horizontal surfaces, etc.) 504, as shown in FIG. 3.

The data assets generated at S500 can be used to identify real objects in the rendered scene, and depths for each identified real object. For example, an object mask can identify pixels associated with each real object in the rendered scene. By generating object masks with clean depth edges, the object boundaries can more easily be identified. By using the dense depthmap, the depth of each identified real object can be identified at each pixel of the object. By virtue of the clean depth edges of the object masks, depth estimates for object edges can be corrected for consistency with edge geometry of the object (e.g., all depths along a straight edge should have the same depth, or depths should lie along a continuous line, etc.). By using the data that identifies the geometric surfaces, depth estimates for object edges can be corrected for consistency with surface geometry of the object (e.g., all depths within a planar surface should have the same depth, or depths that lie within a continuous plane, etc.). For example, depth estimates for a floor surface should be the same, or at least be consistent with a generally flat surface (e.g., not have depths that would suggest that the floor has holes or bulges).

In variants, S500 includes: identifying edge pixels included in edges of real objects included in the photorealistic image, by using at least one generated object mask (e.g., segmentation mask 502), and for at least one edge pixel, adjusting the depth for the pixel based on depths of other edge pixels included in the same edge.

In variants, S500 includes: identifying planar surface pixels that are included in a planar surface identified by the generated geometric surface information (e.g., 504), and for at least one planar surface pixel, adjusting the depth for the pixel based on depths of other planar surface pixels included in the same planar surface. In some implementations, planar surfaces identified by the generated geometric surface information (e.g., 504) include at least one of a wall surface and a floor surface. However, any suitable surface can be identified by the geometric surface information.

Figure 1F:
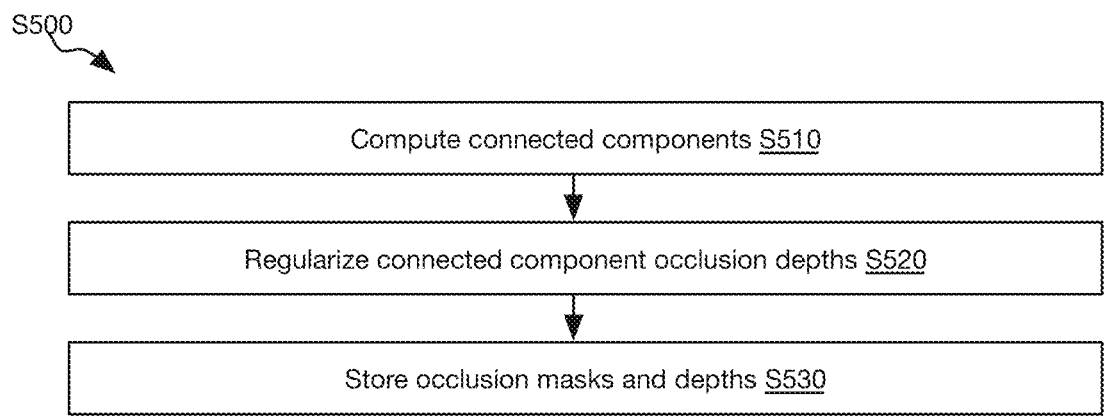

In variants, S500 includes one or more of: computing connected components/subregions S510; regularizing connected component occlusion depths S520; and storing occlusion masks and depths S530, as shown in FIG. 1F. However, S500 can additionally or alternatively include any other suitable process. S500 can be performed after S400, contemporaneously with S400, and/or at any other suitable time.

In variants, S500 is performed by the platform (e.g., 220 shown in FIG. 2), but can additionally or alternatively be performed by the user device (e.g., 210), or by any other suitable system.

Computing connected components/subregions S510 can be performed after S400, but can additionally or alternatively be performed contemporaneously and/or at any other suitable time. In variants, the occlusion masks are determined based on one or more of: the semantic segmentation map (e.g., from S420, from S470, etc.); a subset of the semantic segmentation map (e.g., segments for a given object class); a depth map (e.g., fused depth map from S460, dense depth map, sparse depth map, etc.); and/or any other suitable data. The occlusion masks can be determined using filters (e.g., median filtering, pseudo-median filters, bilateral filters, smoothing, other non-linear digital filtering, etc.) or otherwise determined. Computing connected components S510 can include: for each semantic segmentation class in the class set (identified at S420): gathering the set of independent connected components. In variants, for each connected component, the region masked by the connected component is obtained from the depth map (e.g., obtained at S430 or S460). In variants, a smoothing filter (e.g., median filter smoothing kernel) is applied over the obtained region.

Figure 9:
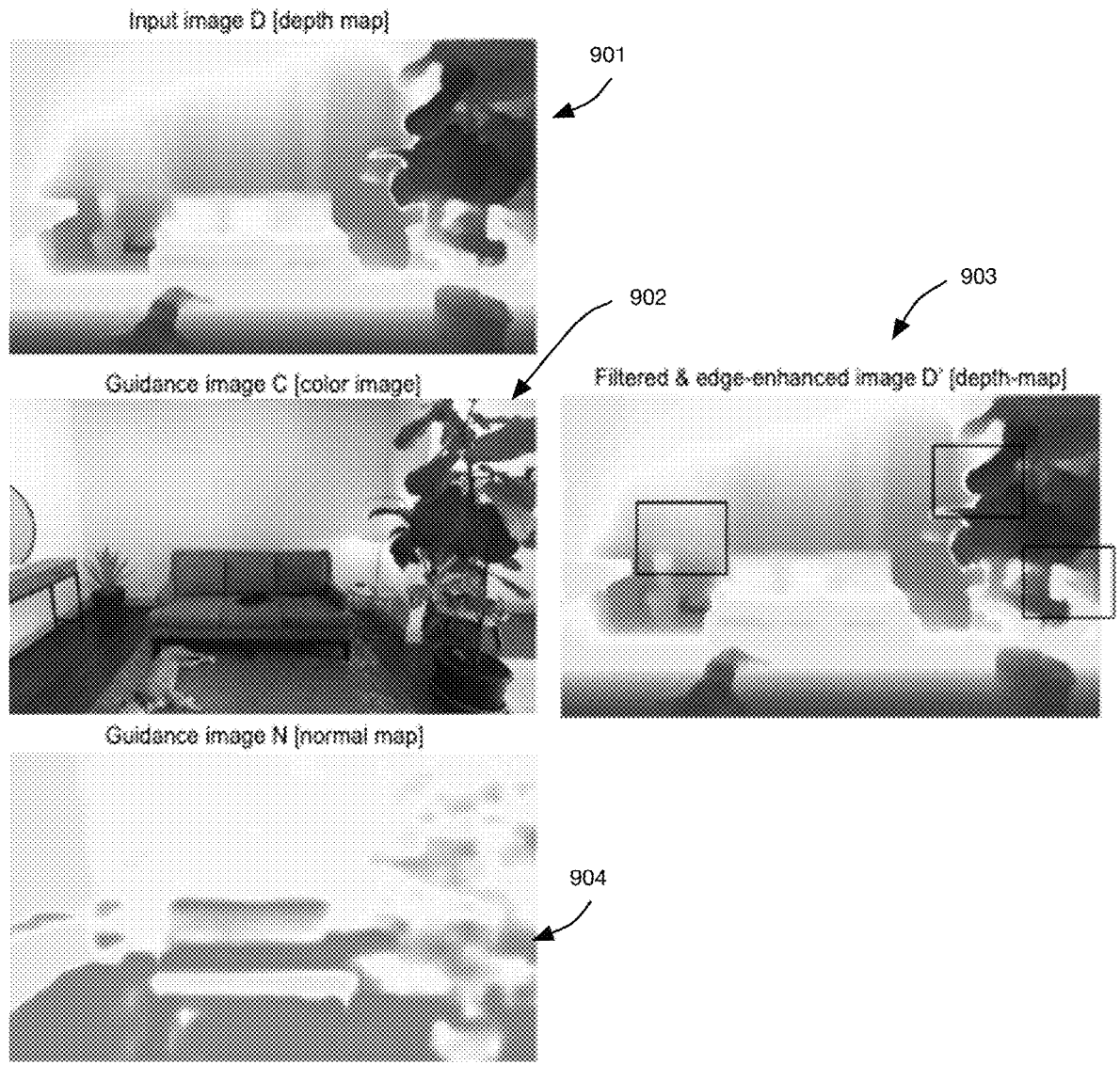
FIG. 9 is an example of S500.

A specific example of a filtered and edge-enhanced depth map is depicted in FIG. 9.

However, S510 can additionally or alternatively include any other suitable elements performed in any other suitable manner.

Regularizing connected component occlusion depths S520 functions to enhance the depths at the edges of objects. By enhancing depths at the edges of objects, visual appearance of a resulting displayed image can be improved. For example, when placing virtual objects in a scene, occlusion of virtual objects by images of real objects can be improved by providing more locally consistent, more RGB consistent, and/or more accurate depths for at the edges of the images of the real objects. By having more accurate depths for edges of real objects, the system can more accurately determine whether a virtual object is placed in front of, or behind, the image of the real object. By more accurately aligning depth edges to color edges of objects, object occlusion is also more convincing. If there is variance in the depths of the real object at the object's edges, the system might determine that the virtual object is in front of portions of the real object, and behind other portions of the real object, resulting in a distorted image. S520 functions to improve the occlusion operations described herein by more accurately determining depths at the edges of real objects.

S520 is preferably performed after S510, but can additionally or alternatively be performed contemporaneously or at any other suitable time.

At S520, depths at the edges of real objects in the image can be more accurately determined by using one or more of depth maps (e.g., 901), color images (e.g., 902) and normal maps (e.g., 904 shown in FIG. 4). This information can be used to more accurately identify the edges of objects, which should have similar depths (or at least depths that vary in a manner that is consistent with the object's geometry.

S520 can include regularizing connected component occlusion depths by combining depth maps, color images and normal maps. S520 can be determined based on depth map(s) (e.g., the fused depth map), a set of images (e.g., from S100, S300), a normal map, and/or any other suitable data.

In one example of S520, depths can be determined by combining depth map(s) (e.g., input image depth map 901 shown in FIG. 9, filtered and/or edge-enhance image depth map 903 shown in FIG. 9), color images (e.g., 902 shown in FIG. 9), and normal map(s) (e.g., 904 shown in FIG. 9). Determining depths by combining depth maps(s), color images and normal map(s) can include: for each pixel in the input image depth map (e.g., 901): given a search window (region of neighboring pixels such as k×k, 3×3, 10×10, etc.), determining a dissimilarity weight using guidance image(s) between pixels i and j. Determining a dissimilarity weight using guidance image(s) between pixels i and j can include determining a similarity between pixels i and j based on one or more of: a color assigned to each pixel, a surface color assigned to a surface that includes the pixels, a surface that is associated with each pixel, and information for each pixel that is recorded in at least one normal map. The dissimilarity weights can be computed based on the determined similarities (e.g., a dissimilarity weight value can increase as the similarity between a pair of pixels decreases). In some implementations, the input image depth map (e.g., 901) is filtered based on the dissimilarity weight (e.g., drawing a sharper edge at pixels with high dissimilarity weights). In other words, adjacent pixels having a high dissimilarity weight can identify a edge of a real object, whereas adjacent pixels having a low dissimilarity weight can identify pixels within an interior region (surface) of the object. In one example, the dissimilarity weight (W) can be calculated as follows:

$$W_{i,j}(C, N) = e^{-\frac{\|C_i - C_j\|}{\sigma_c}} e^{-\frac{\|N_i * N_j\|}{\sigma_n}}$$

$$W_{i,j}(f) = e^{-(\Sigma_f cost(f))}$$

where C is the surface color consistency; surface normal (N) can be determined from the input depth map, provided by a neural network, or otherwise determined; and cost(f) corresponds to the cost of a feature dissimilarity f between pixels i and j, wherein the feature can be one or more of: coplanarity, 3D distance, segmentation, and/or any other suitable feature. The dissimilarity weight is preferably independent from the input image, but can additionally or alternatively be dependent on the input image and/or have any other suitable relationship with the depth image. However, the dissimilarity weights and/or edges can be otherwise determined.

In variants, the regularized connected component occlusion depths generated at S520 include more accurate depth information for edges of real objects included in the image being processed.

However, S520 can additionally or alternatively include any other suitable elements performed in any other suitable manner.

Storing occlusion masks and depths S530 preferably functions to store occlusion masks and/or depths for subsequent use (e.g., by a graphics engine), but can additionally or alternatively provide any other suitable set of functionalities. In variants, the depths include depths for each pixel included in the image being processed. A depth recorded for a pixel (e.g., in a depth map) can include one or more of: a measured depth (e.g., determined by using sensor data) and an estimated depth. S530 is preferably performed after S520, but can additionally or alternatively be performed contemporaneously, and/or at any other suitable time. The occlusion masks and depths can be stored in video memory, texture memory, a buffer, and/or any other suitable memory. S530 preferably includes storing the image being processed (e.g., pano image such as the full resolution wide-angle panorama image, a single image captured on a camera, and/or any other suitable image) and the depth map (which stores a depth for each image pixel) for the image, but can additionally or alternatively include storing any other suitable information. The depth map can have any suitable resolution. In some implementations, the depth map has a resolution that matches the resolution of at least one associated image. Example resolutions can include: panorama resolution, standard camera resolution, and/or any other suitable resolution. In one example of storing the image, the image can be stored as eight bits each of red, green, and blue image pixels, and eight-bit alpha channel which stores binary (foreground or background) masks. In one example of storing the depth map, storing the depth map can include storing a 24-bit depth map (e.g., consuming the red, green, and blue channels) and the inverse floor probability (e.g., represented in 8 bits of alpha). However, S530 can additionally or alternatively include any other suitable elements performed in any other suitable manner.

However, S500 can additionally or alternatively include any other suitable elements.

In variants, S500 includes: the platform 220 providing the generated occlusion data assets to the user device 210.

4.6 Rendering Scenes Interactively with Occlusion Masks S600.

Rendering scenes interactively with occlusion masks S600 preferably functions to render interactive scenes on a user device (e.g., 210). In variants, the scenes are rendered at S600 by using one or more of the occlusion data assets are generated at S500 (e.g., imagery 501; an object mask 502; a dense depthmap 503; and geometric surface information 504, shown in FIG. 3). In variants, the platform provides the occlusion data assets (generated at S500) to the user device. Alternatively, the user device generates the occlusion data assets at S500. In variants, rendering scenes interactively with occlusion masks (S600) includes rendering (e.g., in real time) virtual objects onto a real scene.

Figure 1G:
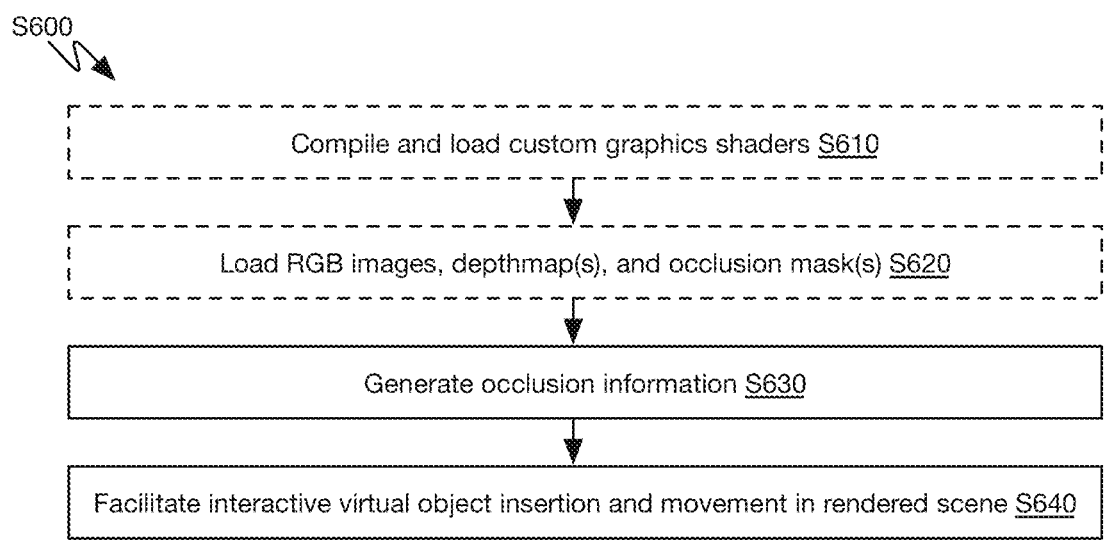

In variants, S600 includes one or more of: compiling and loading custom graphics shaders S610; loading RGB images, depthmap(s), and occlusion mask(s) S620; generating occlusion information S630; facilitating interactive virtual object insertion and movement in the rendered scene S640, as shown in FIG. 1G. However, S600 can additionally or alternatively include any other suitable process. S600 can be performed after S500, contemporaneously with S500, and/or at any other suitable time.

In variants, S600 is performed by the user device (e.g., 210), but can additionally or alternatively be performed by the platform (e.g., 220), or by any other suitable system.

In a first variation of S600, one or more images (e.g., accessed at S100) and/or processed images depth map(s) (e.g., 602 shown in FIG. 10) and semantic segmentation information (e.g., 603 shown in FIG. 10) (e.g., that are stored in memory, video memory and/or texture memory) are written to a framebuffer (e.g., 604 shown in FIG. 10) of the user device (e.g., 210). This data can be written to the framebuffer via one or more blit and/or texturing operations. In some implementations, the framebuffer is given 1) a color image and 2) depth buffer information. The depth buffer selectively occludes based on the earlier-supplied semantic segmentation information (e.g., at S400), discriminating between regions that the framebuffer might occlude and those (regions) which the frame buffer must never occlude during subsequent rendering. For example, semantic segmentation information can be a bitmask, a probability mask, and/or any other suitable mask (e.g., identifying one or a plurality of known labeled features, such as floor which must never occlude rendered 3D objects, like furniture or floor coverings). Determining objects which should not occlude rendered 3D objects can add tolerance to the process, wherein the process might suffer from rendering artifacts and imprecise output of computational photography and AI processing of images (e.g., zfighting) otherwise, and/or confer any other suitable benefit.

Figure 10:
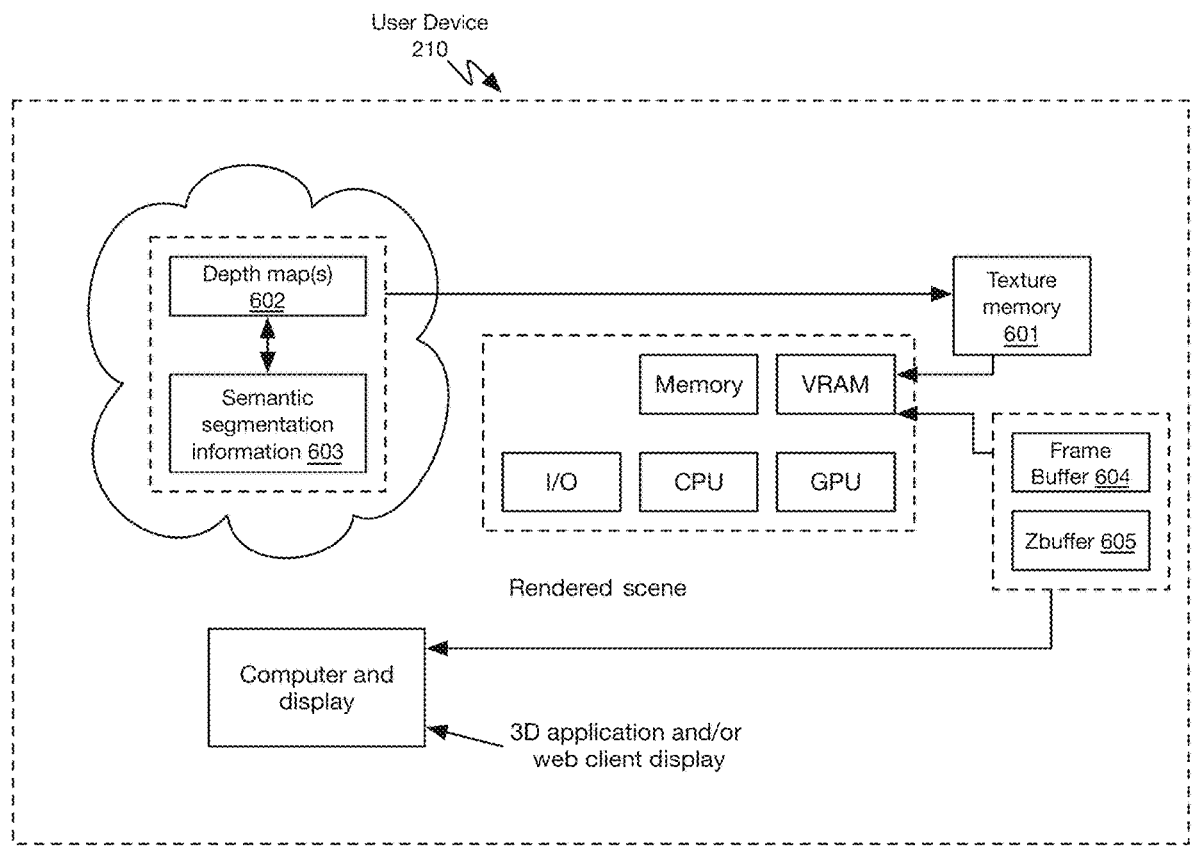
FIG. 10 is a variant of S600.

In a second variation of S600, depth occlusion information and semantic segmentation information can be stored in texture memory (e.g., 601 shown in FIG. 10). In some implementations, the depth occlusion information (e.g., 602 shown in FIG. 10) and semantic segmentation information (e.g., 603 shown in FIG. 10) can be stored in the texture memory (e.g., 601) as components of a packed 3 or 4 component texture and used as a depth value and a write mask in a shader. The depth value can be written to the framebuffer (e.g., 604 shown in FIG. 10), where the semantic segmentation mask allows the framebuffer and the depth information to subsequently occlude 3D rendering. Elsewhere, no value is written or a distant value is written to prevent occlusion of a desired type of data, such as floor coverings or wall coverings.

In a third variation of S600, depth information can be converted from the storage format to depth information expected in the framebuffer for 3D rendering (e.g., normalizing the depth information such as to values between 0 and 1).

S610 is preferably performed after S500, but can additionally or alternatively be performed contemporaneously and/or at any other suitable time. Custom graphics shaders can include a fragment shader and/or a vertex shader, but can additionally or alternatively include any other suitable combination of texture format storage, precision, numerical encodings, use of multiple textures, use of stencil tests instead of and/or in addition to alpha tests, and/or using destination buffer stencil test operations, or any other suitable shader. In one example, the fragment shader converts depth and semantic segmentation information from texture memory and transfers the information to the framebuffer. Optionally, transferring information to the framebuffer can be based on one or more semantic segmentation masks. In a specific example of the framebuffer, 2 bytes of texture information from red and green channels can be converted to 16 bit depth and a conversion to hardware perspective linear depth is generated using near and far clip values supplied as a uniform. The linear depth can be written to the framebuffer or discarded depending on the semantic segmentation information/mask stored in the alpha channel of the texture memory. In a second example, the vertex shader generates pixel fragments using geometry, attributes, and uniforms, but can additionally or alternatively use any other suitable feature. The pixel fragments generated by the vertex shader can be used by the fragment shader to transform the information and/or the pixel fragments can be used in any other suitable process. However, S61 can additionally or alternatively include any other suitable elements performed in any other suitable manner.

Loading RGB images, depthmap(s), and occlusion mask (s) S620 is preferably performed after S61, but can additionally or alternatively be performed contemporaneously or at any other suitable time. The RGB image is preferably the photorealistic image generated in S300, but can be any other suitable image (e.g., an image accessed at S100). The depthmap is preferably the depthmap from S500, but can additionally or alternatively be the depthmap from S400, and/or any other suitable depthmap. The occlusion mask is preferably the foreground masks from S500, but can additionally or alternatively be any other suitable masks. However, S620 can additionally or alternatively include any other suitable elements performed in any other suitable manner.

Generating occlusion information S630 is preferably performed after S620, but can additionally or alternatively be performed contemporaneously or at any other suitable time.

In variants, generating occlusion information S630 can include one or more of: semantically-aware filtering out non-occluding objects using the fragment shader and/or any other suitable shader; writing a fused depth image to the zbuffer (e.g., 605 shown in FIG. 10) over an RGB image (e.g., for hardware accelerated occlusion of synthetic rendered objects).

Figure 1H:
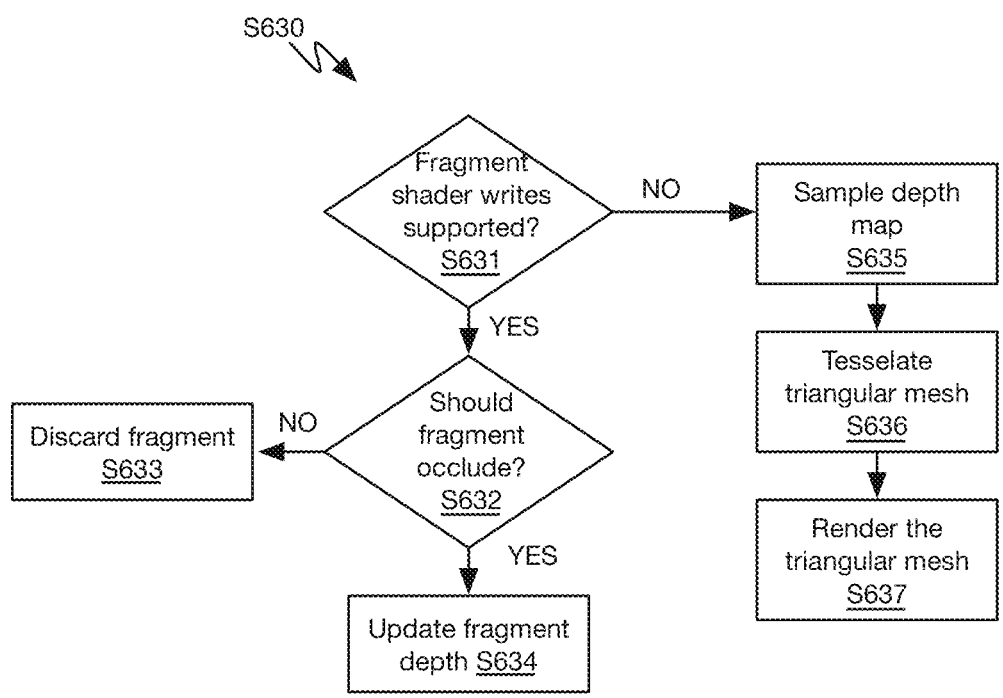
Figure 1I:
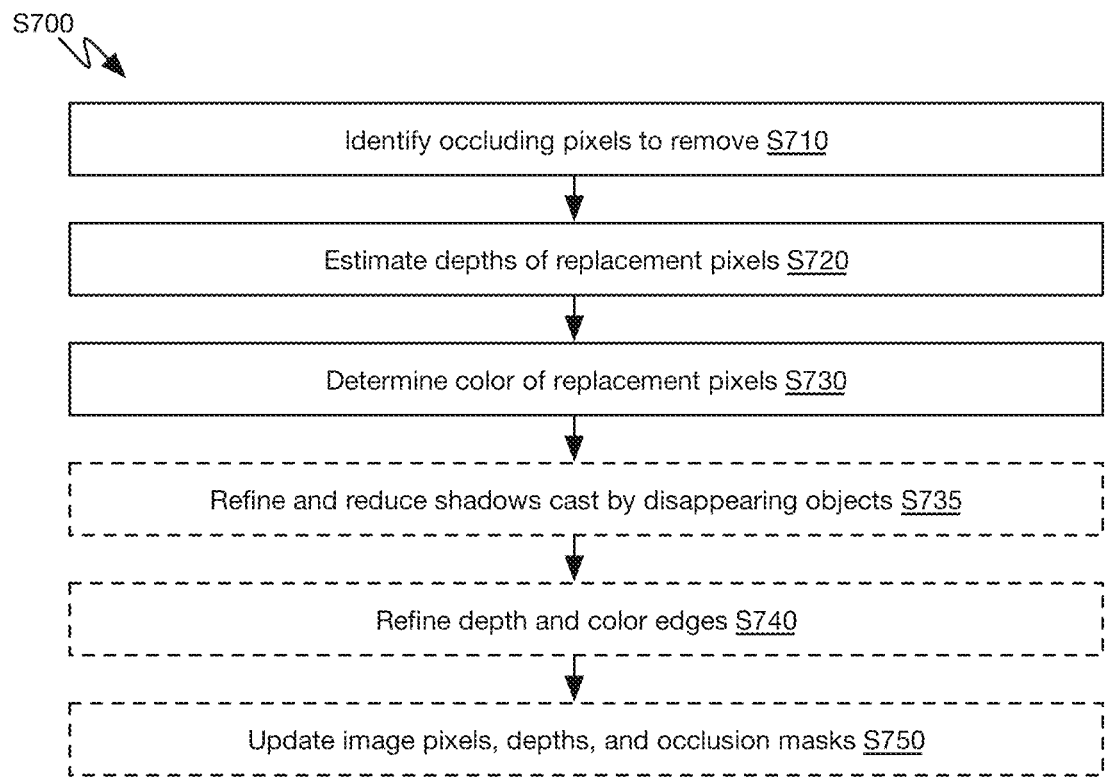

In some variations, generating occlusion information S630 includes determining if a graphics engine (e.g., 211 shown FIG. 2) of the user device (e.g., 210) supports writes to the depth buffer of the user device from a fragment shader of the user device (S631 shown in FIG. 1H). If the graphics engine supports writes to the depth buffer from the fragment shader ("YES" at S631), then the fragment shader loads the RGB image in texture memory of the user device. In some implementations, the graphics engine of the user device binds the RGB image to a rectangular occlusion quad, and the graphics engine registers a custom fragment shader for the rectangular occlusion quad that represents the RGB image. In variants, the occlusion quad is associated with the dense depthmap (loaded at S620). In variants, the custom fragment shader generates occlusion information by processing fragments of the rectangular occlusion quad. In some implementations, the fragments include image pixels from the photorealistic image. In some implementations, processing fragments of the rectangular occlusion quad includes sampling image candidate pixels from the photorealistic images included in the occlusion quad. In some implementations, the fragment shader processes a fragment by determining whether the fragment is segmented as pixel of a surface that should not occlude a virtual object (e.g., a floor surface, wall, ceiling, etc.) (S632). In some implementations, the semantic segmentation information accessed at S600 is used to determine whether fragment is segmented as a pixel of a surface that should not occlude (S632). If the fragment is segmented as pixel that should not occlude a virtual object ("NO" at S632), then the custom fragment shader discards the depth of the fragment (at S633) so that it does not occlude. Otherwise, if the fragment is segmented as pixel that should occlude a virtual object ("YES" at S632), then at S634 the custom fragment shader updates the depth of the fragment by using the depthmap loaded at S620. In variants, the depth of the fragment is updated at S634 with a corresponding depth identified by the depthmap loaded at S620. In some implementations, the custom fragment shader converts the depth identified by the depthmap to a viewport projective depth value, and updates the depth of the fragment to be the converted depth. The generated occlusion information is the depths of the fragments of the rectangular occlusion quad.

If the graphics engine does not support writes to the depth buffer from a fragment shader of the user device ("NO" at S631), then the graphics engine of the user device generates occlusion information by generating an occlusion mesh and tessellating the occlusion mesh. In variants, performing generating the occlusion information by tessellating the occlusion mesh includes sampling the depthmap (loaded at S620) to generate the occlusion mesh (S635). In variants, a sampling density is identified, and the sampling of the depthmap is performed in accordance with the sampling density. The sampling density represents a tradeoff between occlusion accuracy and memory usage and processing performance. The sampling density can be predetermined, configured, dynamically determined, or otherwise identified. In some implementations, each depthmap sample obtained at S635 is converted into an eye-space Z value.

In variants, the graphics engine uses the depthmap samples (e.g., raw samples, samples converted into eye-space Z values, etc.) to tessellate a triangular mesh, such that the depths of the pixels of the triangular mesh correspond to the depths of the depthmap samples (S636). In some implementations, the graphics engine crops triangles of the triangular mesh that overlap with planar segments (e.g., segments representing a floor) that should not occlude. In an example, the graphics engine crops triangles of the triangular mesh that overlap with floor segments such that the image representing the floor does not occlude virtual images rendered by the graphics engine.

In variants, at S637 the triangular mesh is rendered to fill the depth buffer that is used to enable occlusion. In some implementations, the generated occlusion information includes the depths of the pixels of the rendered triangular mesh.

In some implementations, the triangular mesh is registered with a 3D graphics system of the user device as an invisible, z-occluding scene model. In some implementations, the graphics system renders the virtual objects with occlusion by using the triangular mesh. In some implementations, rendering the virtual objects with occlusion by using triangular mesh includes: discarding occluded virtual object pixels, and compositing non-occluded virtual object pixels with the photorealistic image.

In variants, the dense depthmap is updated after rendering the virtual objects with occlusion, and the updated dense depthmap is provided to an end user application (e.g., 212).

Facilitating interactive virtual object insertion, movement, rotation, or configuration in the rendered scene S640 is preferably performed after S630, but can additionally or alternatively be performed contemporaneously or at any other suitable time. The occlusion and positioning behavior of virtual behavior can vary based on object type, scene position, available scene data, and occlusion logic.

In some variants, S640 includes receiving user input identifying selection of at least one virtual object (e.g., by mouse click, scroll wheel, keyboard input, tracking device, etc.) and optionally receiving user input identifying a target location for at least one selected virtual object within the image (e.g., by mouse drag & drop, etc., obtained at S300, obtained at S100, etc.). In response to receiving the user input, one or more virtual objects is rendered onto the image. In some implementations, the user input is received via the user device (e.g., 210 shown in FIG. 2).

In some variants, S640 converts 2D mouse or touchscreen positioning information into 3D scene positioning information. Multiple user interfaces can be supported, changing the mapping from 2D screen position to 3D scene location. In one implementation, the (x,y) coordinates of the mouse pointer or touchscreen indicate (with optional offset) the base point of the object on a floor plane. In a second implementation, the (x,y) coordinates of the mouse pointer or touchscreen indicate (with optional offset) the base point of the object on a geometric surface. In a third implementation, the (x,y) coordinates of the mouse pointer or touchscreen indicate (with optional offset) the base point of the object on a wall. In a fourth implementation, the (x,y) motions of the mouse pointer or touchscreen relatively move an object along a surface.

In some variants, S640 assumes virtual objects to be positioned on the floor plane, mapping 2D pointing positions over a 2D image to 3D virtual positioning of an object on the floor plane, permitting 3D computations of virtual object depths and occlusion. Optionally, positioning can be constrained to limit placement of the object to empty floor regions. In floor placement modes, it is optionally possible to place objects behind walls (where they can be occluded).

In some variants, S640 includes special handling for hanging objects on walls or other vertical surfaces (e.g., mirrors, wall art, wall sconces, etc.). In some implementations, the system uses metadata associated with the virtual object to identify a virtual object as a hangable object. Alternatively to variants where the objects are fixed to a ground plane, in hangable modes, a 2D position on a wall would not slide an object along the ground plane where it could be potentially placed and occluded behind a wall—instead the 2D mouse motion would map to 3D positions along the hangable surface.

In some variants, S640 includes special handling for "stacking" virtual objects on top of existing virtual or real objects (e.g., placing a vase on a table, or a pillow on a sofa). In some implementations, the system uses metadata associated with the virtual object to identify a virtual object as a "stackable" virtual object. Alternatively to variants where the objects are fixed to a ground plane, in stackable mode, the bottom index point of stackable objects can ride along the vertical surface contour of scene geometry, and adhere to arbitrary geometric surfaces as the object is moved, modifying the normal floor placement and occlusion, such that the virtual object is considered to be placed ON the placeable surface instead of on the floor. In this mode, the coordinates of the pixels (in the image coordinate space) of the virtual object are automatically updated to render the virtual object on top of the placeable surface.

In some variants, S640 uses geometric representations of the scene (e.g., depthmaps, normal maps, meshes, etc.) and/or gravity, to position stackable objects in scene imagery.

In some variants, S640 uses horizontal surface detection and/or semantic segmentation to identify valid locations for placing stackable objects (e.g., a flat, horizontal area such as a table top, shelf, or countertop).

In some variants, S640 includes rendering virtual objects using occlusion information generated at S630, using the generated occlusion information to perform occlusion processing for virtual objects that overlap real objects in the rendered scene. For each virtual object pixel of the virtual object, the depth for the virtual object pixel is identified. The image pixel of the image being processed at the same location (in the image's coordinate space) as the virtual object pixel is also identified, and the depth of this pixel is identified (by using the occlusion information generated at S630). Optionally, the depths of other virtual object pixels at the same location are identified. The pixel having the shortest depth at the location is displayed. If the depth of the virtual object pixel is the lowest, then the virtual object pixel is displayed. If the depth of the image pixel is the lowest, then the image pixel is displayed. If the depth of another virtual object pixel is the lowest, then the other virtual object pixel is displayed.

An example of S600 is depicted in FIG. 4.

However, S600 can additionally or alternatively include any other suitable elements.

4.7 Removing Objects in the Rendered Scene S700.

In variants, S700 functions to remove real objects, or portions of real objects, from the rendered scene (e.g. removing a sofa from a scene so you can replace with another). However, S700 can additionally or alternatively perform any other suitable set of functionalities (e.g. move, copy, clone, etc.). S700 is preferably performed after S600, but can additionally or alternatively be performed contemporaneously, or at any other suitable time. S700 is preferably performed by the user device (e.g., 210 shown in FIG. 2), but can additionally or alternatively be performed by the platform (e.g., 220), or by any other suitable system.

In some implementations, the scene is represented as an image, and images of real objects (or portions of images of real objects) in the scene are removed. In an example, the image is an RGB image. However, the scene can be represented as any suitable type of image. In variants, images of real objects are 2D representations of 3D objects. In some implementations, removing pixels of a real object from a rendered scene includes adjusting color values. For example, removed pixels can be replaced with color patterns that indicate deletion, or plausibly represent background textures. In some implementations, removing pixels of a real object from a rendered scene includes changes to occlusion behavior such as disabling occlusion for removed pixels, removing depth information for pixels of the object from the 3D depthmap of the scene, and/or replacing the depths of the removed pixels with new depth values.

In a first variation, removing pixels of real object(s) in the rendered scene (S700) includes one or more of: identifying pixels to remove S710; estimating depths of replacement pixels (e.g., by using estimated scene geometries to reconstruct the 3D depths and/or shapes likely to appear behind the removed pixels) S720; determining color of replacement pixels (including adjustment of colors of pixels outside the region being replaced for the purpose of color harmonization, blending, or shadow management) S730; improving the resulting geometry and imagery S740; and storing the resulting model for future use S600. However, S700 can additionally or alternatively include any other suitable process. However, S700 can be otherwise performed.

Identifying pixels to remove from the rendered scene S710 is preferably performed after S600, but can additionally or alternatively be performed contemporaneously or at any other suitable time. In one example of S710, pixels can be identified by the user interfacing with the end user application (e.g., 212). In some implementations, a user interface provided by the end user application (e.g., 212 shown in FIG. 2) receives user input via a user input device included in the user device (e.g., 210). In some implementations, the user interface includes user input elements that receive user input that is used by the system to identify pixels to be replaced. Example user input approaches include: a "magic eraser brush", lasso and/or region selector, segment selector, and/or object selector (e.g., couch, table, and/or any other suitable connected component). In a first example, user input identifying selection of pixels to be replaced includes: information identifying movement of a "magic eraser brush" in a coordinate space of the image from which pixels are to be removed. In a second example, user input identifying selection of pixels to be replaced includes: information identifying a rectangular region of the image. In a third example, user input identifying selection of pixels to be replaced includes: information identifying a freeform lasso region of pixels to erase. In a fourth example, user input identifying selection of pixels to be replaced includes: information identifying a segment of the image (e.g., generated as output of a semantic segmentation process performed on the image). In a fifth example, user input identifying selection of pixels to be replaced includes: selecting a coherent, pre-segmented object instance (e.g., click to select a segmented region of pixels estimated to belong to a table). In a sixth example, user input identifying selection of pixels to be replaced includes: selecting a visually coherent region or "superpixel" (e.g., click to select a superpixel region to remove). In a seventh example, user input identifying selection of pixels to be replaced includes: information identifying desire to remove foreground objects, yielding an empty room. In this example, the system removes all pixels that are not included in image segments related to structural components of a room (e.g., floor, walls, ceiling, stairs) or objects that are not likely to be removed from a room (e.g., doors, cabinetry, built-ins). However, one or more objects or sets of pixels to be removed can otherwise be identified. Optionally, the user can interactively add/delete/modify removal regions, however the end user application can provide the user with any other suitable set of tools to modify the scene.

Estimating depths of replacement pixels S720 is preferably performed after S710, but can additionally or alternatively be performed contemporaneously and/or at any other suitable time.

In a first variant, S720 includes: for each replacement pixel, setting the depth to a depth related to a known depth or a predicted depth for a key geometric surface (or surfaces) behind (or predicted to be behind) the location of the pixel being replaced. In some implementations, the key geometric surface is an architectural geometric surface of a room (e.g., a wall, a floor, etc.). In variants, the new depth for a replacement pixel is interpolated based on known or estimated depths for pixels of the partially-occluded surface (or surfaces) that surround the replacement pixel. For example, in removing an object that is positioned in front of a wall in an image of a room, the new depths for the pixels at the location (in the image's coordinate space) of the removed object are determined based on known depths for the wall. As another example, in removing an object that is positioned in front of a corner formed by two walls in an image of a room, the new depths for the pixels at the location (in the image's coordinate space) of the removed object are determined based on known geometry for the two walls. In some implementations, the pixels associated with the key geometric surfaces of the image are identified by using the key geometric surfaces information 504 generated at S500, and the depths for these pixels are identified by using the dense depthmap generated at S500. The system identifies the most likely key surface (or surfaces) that is behind the pixel being replaced, and uses the known depths of the identified surface to interpolate (or estimate) the new depth of the replacement pixel.

In a second variant, S720 includes: for each replacement pixel, setting the depth to a depth related to a known (or estimated) depth for an object surface (or surfaces) that includes the location of the pixel being replaced. For example, in removing an object that is positioned in front of a couch in an image of a room, the new depths for the pixels at the location (in the image's coordinate space) of the removed object are determined based on known or estimated depths for the couch behind the removed object. In some implementations, the pixels associated with object surfaces of the image are identified by using the segmentation masks 502 generated at S500, and the depths for these pixels are identified by using the dense depthmap generated at S500. The system identifies the most likely object surface (or surfaces) that is behind the pixel being replaced, and uses the known depths of the identified object surface to interpolate (or estimate) the new depth of the replacement pixel.

In a third variant, S720 includes for each replacement pixel, setting the depth to a predetermined depth (e.g., an infinite depth, such that the replacement pixel of the image does not occlude any virtual objects rendered onto the image).

In a fourth variant, S720 makes use of a more complete 3D view of the scene, where there are multiple layered depth values behind a replacement pixel visible from the images collected in S100, beyond the panoramic image and depthmap produced by S330. In such a case, S210-S250 may produce depth data for portions of the scene which are occluded by real object(s) which are subsequently selected for removal in S710. In this case, S720 can determine the depth from the closest of the multiple layered depth values, the most distant of the multiple layered depth values, or allow the user to choose or cycle through the occlusion options for the removed pixels.

In a fifth variant, S720 can include using estimates of volumetric scene geometry, occupancy data, or plenoptic light fields for the scene to hypothesize depths of replacement pixels after the removal of geometry.

In some implementations, S720 includes one or more of: given consistent depth profiles to one or multiple sides of the object for removal, extruding the depth profiles (e.g., to extend soffits, molding and/or any other suitable/common features); given a partially obscured object, recognizing a similar object, and virtually completing and instantiating the object behind the object for removal (e.g., using the depths from the virtually rendered object/partially obscured object). However, S720 can additionally or alternatively include any other suitable elements performed in any other suitable In some implementations, S720 can include training a neural network (e.g., convolutional neural network, fully-connected neural network, generative neural network, feed forward neural network, etc.), such as a deep neural network (e.g., generative image inpainting with contextual attention) on dense depth maps with regions marked for removal supervised by dense depth maps with the correct replacement depth in these regions. The training dataset can be generated by creating depth maps of 3D CAD models of representative scenes with room structure and furniture models. Selection regions can be generated by choosing scene objects (e.g., furniture, art, etc.) to remove. The supervised depth map can be generated from the modified CAD model without the chosen object. During execution, an updated depth map can be generated by feeding the network a new depth map (e.g., not part of the training dataset) with a "selected region".

Determining the color of the replacement pixels S730 is preferably performed after S720, but can additionally or alternatively be performed contemporaneously and/or at any other suitable time.

In variants, determining the color of replacement pixels at S730 includes one or more of: performing context-aware fill (inpainting) to determine a color for one or more pixels included in the region of replacement pixels (e.g., the region of pixels replacing the pixels belonging to the removed object); replacing erased pixels with locally median color (e.g., median color in the vertical/horizontal/patch nearest to the removed object); receiving user input via the end user application (e.g., 212 shown in FIG. 2) that identifies color selection (e.g., by pixel, patch, area, material, style, etc.) for one or more of the replacement pixels; neural network region filling, wherein a neural network determines the color of replacement pixels; replacing erased pixels with a "transparency grid" signifying deletion; using "correspondence search or nearest neighbor search to determine the pixel color(s) (e.g. using "PatchMatch" techniques); using texture synthesis techniques; using neural network inpainting techniques; receiving user input (via the end user application) that identifies paint replacement instructions; receiving user input (via the end user application) that identifies anchor replacement area and fill based on the replacement area; receiving user input (via the end user application) that identifies one or more possible color variants; determining color based on images from S100 which include the area being revealed; and determining a color based on of partial objects adjacent to the removed item.

However, S730 can additionally or alternatively include any other suitable process. In a first variant, the color of replacement pixels is the same as the original color of the pixels being replaced. In a second variant, the color of replacement pixels is different from the original color of the pixels being replaced.

In a third variant, the color of replacement pixels represents a "ghost version" of the original pixels, by modifying the original replacement color in a manner to suggest deletion, such as adjusting the saturation, brightness or color of the replacement pixels. These adjustments can be static, or vary based on user action or time (e.g., have deleted pixels periodically "pulse" or "glow" to indicate deletion). In an example, determining the color of replacement pixels at S730 includes assigning to a replacement pixel one of: a static ghosting color, a dynamic ghosting color, a static ghosting pattern, and a dynamic ghosting pattern. In an example, determining a color for a replacement pixel includes assigning a ghosting color (or time varying series of colors) to the replacement pixel, to visually signify deletion. The ghosting color can be any suitable color that identifies a pixel as being associated with an object that has been deleted from the image. For example, the ghosting color can be a grey color, a black color, a color with less intensity as the original color, a lighter color, a darker color, a color with less contrast, a transparency grid pattern, a time-varying or animated pattern, or any suitable type of color that can be used to distinguish a replacement pixel from other pixels in the image. In particular, the ghosting pattern can be evocative of the room geometry that lies behind the removed pixels. Pixels with floor behind them can be filled with a ghost pattern that looks like a tile floor. Pixels with wall behind them can be filled with a ghost pattern that looks like a simple wallpaper pattern. These ghosting color patterns can optionally be perspective warped by the replaced depth (e.g., wall, floor depths) for added realism.

In a fourth variant, the color of replacement pixels constructs a "transparency grid" or "checkerboard" to visually suggest deletion of pixels. Optionally, the transparency grid can be perspective warped using scene geometry of the replacement geometry (e.g., depths, normals, etc.) to provide more realistic sense of deletion.

In a fifth variant, determining the color of replacement pixels at S730 includes: given an RGB image with "holes" for the replacement object(s) (e.g., a hole can be associated with a region of replacement pixels associated with the objects to be replaced), determining the color can be based on search for appropriate replacement patterns in the scene using forms of nearest neighbor search. The search can be executed for each pixel in each hole in an order (e.g., scan line order, inward order, etc.), the nearest pixel in the input image, fill the hole with its color and depth. The search can be repeated until convergence, until a predetermined threshold (e.g., based on time, based on iterations, and/or otherwise based), or until another condition is met. Optionally, PatchMatch techniques can used with randomized nearest neighbor search, but additionally or alternatively any other suitable technique can be used.

Nearest neighbor search can include defining a distance between pixels (e.g., p and q) based on their neighbors (e.g., $N(p)$ and $N(q)$) wherein the distance can be determined based on color ("c"), depth ("d"), and label ("s"): $d(p,q)=f(c\_N(p), c\_N(q), d\_N(p), d\_N(q), s\_N(p), s\_N(q))$ In a sixth variant, S730 can include training and using a neural network (e.g., convolutional neural network, fully-connected neural network, generative neural network, feed forward neural network, etc.), such as a deep neural network (e.g., generative image inpainting with contextual attention) on images with "holes" supervised by original images without "holes." Holes can be generated by removing objects (e.g., furniture, art, etc.) or portions of objects in one or more of the collected images. During execution, the infilled image can be generated by feeding the network a new image (e.g., not part of the training dataset) with "holes", a cropped image with "holes" and/or any other suitable image. The training datasets can be comprised of images of representative scenes either photographed or synthetically rendered using CGI graphics, or otherwise constructed.

In a seventh variant, S730 can include recognizing a likely similar object (e.g., identifying a furniture product of similar size and appearance from a database, based on partially obscured imagery) and virtually completing the object behind the disappearing object using the RGB pixels from the virtually rendered form of the likely similar object, and blending appropriately.

In an eighth variant, S730 can include using estimates of plenoptic light fields for the scene to hypothesize colors of replacement pixels after the removal of occlusion geometry.

In a ninth variant, determining a color for a replacement pixel includes identifying user selection of a color patch for the replacement pixels (e.g., from information received via the end user application 212) and using samples from the identified patch or statistically related textures to generate the replacement pixel.

In a tenth variant, determining a color for a replacement pixel includes identifying user selection of a color, and assigning the selected color to the pixel. The user selection of the color can be related to the replacement pixel, or a patch of pixels that includes the replacement pixel.

In an eleventh variant, determining a color for a replacement pixel includes performing texture synthesis to identify a texture of pixels surrounding the replacement pixels. In some implementations, the identified texture is represented by a pattern of pixels having a specific assignment of colors. A replacement color for the replacement pixel is identified by the texture, and the replacement color is assigned to the replacement pixel. Replacement colors are assigned to a region of replacement pixels, such that after replacement colors are assigned to the replacement pixels in the region, the colors of the pixels in the region conform to the identified texture. Assigning replacement colors to replacement pixels can include one or more of cloning, CNN inpainting, propagating, or patch-matching colors of related regions (e.g., wall regions, floor regions, instances, classes) to the region of replacement pixels. However, texture synthesis can otherwise be performed. If the replacement pixels have had their depth replaced by depths that agree with or were drawn from an architectural plane (e.g., wall, floor) then the texture synthesis can be automatically sourced from elsewhere nearby on that plane. Further, the texture synthesis can be performed on a rectified version of the image of that plane and then returned to the image via perspective warping (homography). Many texture synthesis algorithms produce better results on such an image of a rectified plane.

In a twelfth variant, determining a color for a replacement pixel includes globally replacing a region of pixels with a coherent synthetic texture. In variants, the replaced region represents an architectural structure, such as a floor or a wall. Determining a color for replacement pixels in this example includes replacing an entire architectural structure (e.g., a floor, a wall, etc.) that includes the replacement pixels with a new virtual object. In variants, the new virtual object (e.g., new floor, new wall, etc.) has a solid color. Alternatively, the new virtual object includes pixels having various colors that represent a synthetic texture. In some implementations, the system textures a CAD (Computer Aided Design) model (or pieces of a CAD model) to replace the real object include in the image. In some implementations, determining a color for a replacement pixel of a real object to be removed (S730) includes: generating a replacement virtual object that includes the location of the replacement pixel, wherein the replacement virtual object includes pixels having various colors that represent a synthetic texture; and rendering the replacement virtual object. In some implementations, rendering the replacement object replaces not only the pixels of the real object that is removed, but also surrounding pixels. For example, to remove a real object that is placed on a floor of an image of a room, the real object representing the floor can be replaced with a virtual object (e.g., generated by using a CAD model) that represents the floor.

However, S730 can additionally or alternatively include any other suitable elements performed in any other suitable manner.

Refining shadows in the remainder of the image S735 is preferably performed, to reduce residual shadows outside the area of replacement pixels, that are cast by objects targeted for removal.

In a first variant, S735 uses statistical image processing techniques to detect and reduce (e.g., filter, blur, blend) likely cast shadows outside the area of replacement pixels.

In a second variant, S735 uses shadow detection techniques, including trained neural networks, to isolate and reduce (e.g., filter, blur, blend) cast shadows outside the area of replacement pixels.

In a third variant, S735 uses estimates of light source locations to estimate shadow directions from the disappearing object, to isolate and reduce (e.g., filter, blur, blend) likely cast shadows outside the area of replacement pixels.

In a fourth variant, S735 uses intrinsic image decomposition techniques to decompose the image into reflectance and shading lighting components. Shading components nearby the removed object (in 2D image space or 3D space) can be evaluated for reduction or removal.

In a fifth variant, S735 can include using estimates of plenoptic light fields and/or inverse lighting techniques to detect and reduce (e.g., filter, blur, blend) likely cast shadows outside the area of replacement pixels. Inverse lighting methods can include using estimates of light sources and estimates of scene geometry to estimate image regions where cast shadows are likely, and quantify the degree of shading.

In a sixth variant, S735 can include training a neural network (e.g., convolutional neural network, fully-connected neural network, generative neural network, feed forward neural network, etc.), such as a deep neural network (e.g., generative image inpainting with contextual attention) on images that include "a furniture hole" and the shadow cast by the missing furniture. The network is supervised by images with the hole but without the shadow. The training dataset can be generated by ray tracing photorealistic images of fully furnished rooms with and without a single selected piece of furniture. The pixels occupied by this piece of furniture form the hole.

However, S735 can additionally or alternatively include any other suitable elements.

Refining the depth and color edges S740 is preferably performed after S730, but can additionally or alternatively be performed contemporaneously and/or at any other suitable time. In one example, S740 can include: creating "sharp" wall/floor seams, improving global color patterns and/or preserving architectural seams. S740 can use the estimated planes, the depth map, and/or any other suitable data to refine the depth edges. However, S740 can additionally or alternatively include any other suitable elements performed in any other suitable manner.

Updating image pixels, depths, and/or occlusion masks S750 is preferably performed after S740, but can additionally or alternatively be performed contemporaneously and/or at any other suitable time. In one example S750 includes storing the changes in memory associated with the end user application. However, S750 can additionally or alternatively include any other suitable elements performed in any other suitable manner.

However, S700 can additionally or alternatively include any other suitable elements.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method executed by one or more computing devices of an image processing platform, the method comprising:
   accessing a photorealistic image of a room;
   generating at least one segmentation mask that identifies real objects included in the photorealistic image;
   generating geometric surface information for the photorealistic image;
   generating a dense depthmap that includes depth estimates for each pixel of the photorealistic image, wherein generating the dense depthmap comprises:
      identifying edge pixels included in edges of real objects included in the photorealistic image based at least in part on the at least one generated segmentation mask;
      for at least one edge pixel, enhancing the depth for the pixel based at least in part on depths of other edge pixels included in the same edge;
      identifying planar surface pixels that are included in a planar surface identified by the generated geometric surface information; and
      for at least one planar surface pixel, adjusting the depth for the pixel based at least in part on depths of other planar surface pixels included in the same planar surface; and
   transmitting at least one segmentation mask, the dense depthmap, and the geometric surface information to an end user application executed by a user device.

2. The method of claim 1, wherein the end user application is configured to render at least one virtual object onto the photorealistic image based at least in part on the dense depthmap, at least one segmentation mask, and the geometric surface information.

3. The method of claim 2, wherein the end user application is configured to render at least one virtual object onto the photorealistic image by, for each virtual object pixel of the virtual object:
   determining a depth of the virtual object pixel;
   determining a depth of an image pixel at the same location as the virtual object pixel;
   in response to a determination that the depth of the image pixel is greater than the depth of the virtual object pixel, displaying the virtual object pixel; and
   in response to a determination that the depth of the virtual object pixel is greater than the depth of the image object pixel, displaying the image pixel.

4. The method of claim 3,
   wherein the photorealistic image is bound to a rectangular occlusion quad of the user device,
   wherein the occlusion quad is associated with the dense depthmap,
   wherein a fragment shader included in the user device processes image candidate pixels from the photorealistic image on the occlusion quad and virtual object candidate pixels from the virtual objects, and
   wherein, for each virtual object pixel, determining the depth of the image pixel at the same location as the virtual object pixel comprises: for each virtual object candidate pixel, accessing the depth of the image candidate pixel from the occlusion quad at the same location as the virtual object pixel, by using the dense depthmap associated with the occlusion quad.

5. The method of claim 4, further comprising:
   generating an updated dense depthmap; and
   wherein the end user application is configured to render at least one virtual object onto the photorealistic image based at least in part on the at least one segmentation mask, the updated dense depthmap, and the geometric surface information; and
   wherein the end user application is configured to render at least one virtual object onto the photorealistic image by, for each virtual object pixel of the virtual object:
   determining a depth of the virtual object pixel;
   determining a depth of an image pixel at the same location as the virtual object pixel;
   in response to a determination that the depth of the image pixel is greater than the depth of the virtual object pixel, displaying the virtual object pixel; and
   in response to a determination that the depth of the virtual object pixel is greater than the depth of the image object pixel, displaying the image pixel.

6. The method of claim 2, wherein the end user application is configured to render at least one virtual object onto the photorealistic image by, for each virtual object pixel of the virtual object:
   determining a depth of the virtual object pixel;
   sampling the dense depthmap to generate depthmap samples;
   generating a triangular occlusion mesh;
   tesselating the triangular occlusion mesh, such that the depths of the pixels of the triangular mesh correspond to depths of the depthmap samples;
   registering the triangular occlusion mesh with a 3D graphics system of the user device as an invisible, z-occluding scene model; and
   using the 3D graphics system to render the virtual objects with occlusion by the triangular occlusion mesh by discarding occluded virtual object pixels and compositing non-occluded virtual object pixels with the photorealistic image.

7. The method of claim 2, wherein the end user application is configured to render at least one virtual object onto the photorealistic image by, for each virtual object pixel of the virtual object:
   identifying placeability behavior of the virtual object;
   mapping two-dimensional user interface pointer coordinates to three-dimensional scene coordinates based on the placeability behavior of the virtual object and nearby scene geometry;
   determining a depth of the virtual object pixel;
   determining a depth of an image pixel at the same location as the virtual object pixel;
   in response to a determination that the depth of the image pixel is greater than the depth of the virtual object pixel, displaying the virtual object pixel; and
   in response to a determination that the depth of the virtual object pixel is greater than the depth of the image object pixel, performing placement processing for the virtual object pixel.

8. The method of claim 1, further comprising:
   updating the dense depthmap, and
   transmitting an updated dense depthmap to the end user application.

9. The method of claim 1, further comprising:
   receiving user selection information identifying selected portions of at least one real object to be removed from the photorealistic image; and
   for each pixel in the selected portions:
      estimating a new depth for the pixel and updating the dense depthmap to include the new depth, and
      determining a replacement color for the pixel and updating the photorealistic image to include the determined color.

10. The method of claim 9, further comprising:
for each real object to be removed, reducing at least one cast shadow associated with the real object to be removed,
wherein estimating a new depth for a pixel of a selected portion comprises updating the dense depthmap to include a predetermined depth as the new depth for the pixel, and
wherein reducing at least one cast shadow comprises at least one of:
inferring at least one cast shadow by performing image processing,
inferring at least one cast shadow by using a trained neural network,
inferring at least one cast shadow from detected and estimated light sources,
inferring at least one cast shadow from intrinsic image decomposition, or
inferring at least one cast shadow from plenoptic light fields.

11. The method of claim 9, wherein estimating a new depth for a pixel of a selected portion comprises:
identifying a room architectural geometric surface that includes the location of the pixel, based at least in part on the generated geometric surface information for the photorealistic image, wherein the generated geometric surface information identifies at least one room architectural geometric surface included in the photorealistic image;
identifying at least one depth of the room architectural geometric surface, based at least in part on the generated dense depthmap;
computing a depth for the pixel based at least in part on the identified at least one depth of the room architectural geometric surface; and
updating the dense depthmap to include the computed depth as the new depth for the pixel.

12. The method of claim 9, wherein estimating a new depth for a pixel of a selected portion comprises:
estimating a depth of an obscured geometric surface obscured by the selected portion based at least in part on the dense depthmap to identify depths of the real objects surrounding the selected portion; and
updating the dense depthmap to include the estimated depth of the obscured geometric surface as the new depth for the pixel.

13. The method of claim 9, wherein estimating a new depth for a pixel of a selected portion comprises:
estimating a depth of an obscured geometric surface obscured by the selected portion based at least in part on trained neural networks and geometric priors from the dense depthmap; and
updating the dense depthmap to include the estimated depth of the obscured geometric surface as the new depth for the pixel.

14. The method of claim 9, wherein determining a replacement color for a pixel of a selected portion comprises: assigning to the pixel one of: a static ghosting color, a dynamic ghosting color, a static ghosting pattern, or a dynamic ghosting pattern.

15. The method of claim 9, wherein determining a replacement color for a pixel of a selected portion comprises:
identifying user selection of a color and assigning the selected color to the pixel,
wherein the user selection of the color relates to one of: the pixel or a patch of pixels that includes the pixel that is assigned the color.

16. The method of claim 9, wherein determining a replacement color for a pixel of a selected portion comprises:
assigning a color of a transparency grid pattern to the pixel.

17. The method of claim 16, wherein the transparency grid pattern is perspective warped based on inferred geometry behind the selected portion.

18. The method of claim 9, wherein determining a replacement color for a pixel of a selected portion comprises:
performing texture synthesis to identify a texture of pixels likely surrounding the pixel;
identifying a replacement color for the pixel by using the identified texture; and
assigning the replacement color to the pixel.

19. The method of claim 9, wherein determining a replacement color for a pixel of a selected portion comprises at least one of:
generating a replacement virtual object that includes the location of the pixel, wherein the replacement virtual object includes pixels having various colors that represent a synthetic texture; or
estimating a plenoptic light field for a scene of the photorealistic image and using the light field to re-generate an image area affected by removal of pixels included in the selected portion.

20. A method executed by one or more computing devices of an image processing platform, the method comprising:
accessing a photorealistic image of a room;
generating at least one segmentation mask that identifies real objects included in the photorealistic image;
generating geometric surface information for the photorealistic image;
generating a dense depthmap that includes depth estimates for each pixel of the photorealistic image; and
transmitting at least one segmentation mask, the dense depthmap, and the geometric surface information to an end user application executed by a user device;
wherein the end user application is configured to render at least one virtual object onto the photorealistic image based at least in part on the dense depthmap, at least one segmentation mask, and the geometric surface information by, for each virtual object pixel of the virtual object:
determining a depth of the virtual object pixel;
determining a depth of an image pixel at the same location as the virtual object pixel;
in response to a determination that the depth of the image pixel is greater than the depth of the virtual object pixel, displaying the virtual object pixel; and
in response to a determination that the depth of the virtual object pixel is greater than the depth of the image object pixel, displaying the image pixel.

21. A method executed by one or more computing devices of an image processing platform, the method comprising:
accessing a photorealistic image of a room;
generating at least one segmentation mask that identifies real objects included in the photorealistic image;
generating geometric surface information for the photorealistic image;
generating a dense depthmap that includes depth estimates for each pixel of the photorealistic image; and transmitting at least one segmentation mask, the dense depthmap, and the geometric surface information to an end user application executed by a user device;

wherein the end user application is configured to render at least one virtual object onto the photorealistic image based at least in part on the dense depthmap, at least one segmentation mask, and the geometric surface information by, for each virtual object pixel of the virtual object:

determining a depth of the virtual object pixel;

sampling the dense depthmap to generate depthmap samples;

generating a triangular occlusion mesh;

tesselating the triangular occlusion mesh, such that the depths of the pixels of the triangular mesh correspond to depths of the depthmap samples;

registering the triangular occlusion mesh with a 3D graphics system of the user device as an invisible, z-occluding scene model; and using the 3D graphics system to render the virtual objects with occlusion by the triangular occlusion mesh by discarding occluded virtual object pixels and compositing non-occluded virtual object pixels with the photorealistic image.

22. A method executed by one or more computing devices of an image processing platform, the method comprising:

accessing a photorealistic image of a room;

generating at least one segmentation mask that identifies real objects included in the photorealistic image;

generating geometric surface information for the photorealistic image;

generating a dense depthmap that includes depth estimates for each pixel of the photorealistic image; and transmitting at least one segmentation mask, the dense depthmap, and the geometric surface information to an end user application executed by a user device;

wherein the end user application is configured to render at least one virtual object onto the photorealistic image based at least in part on the dense depthmap, at least one segmentation mask, and the geometric surface information by, for each virtual object pixel of the virtual object:

identifying placeability behavior of the virtual object;

mapping two-dimensional user interface pointer coordinates to three-dimensional scene coordinates based on the placeability behavior of the virtual object and nearby scene geometry;

determining a depth of the virtual object pixel;

determining a depth of an image pixel at the same location as the virtual object pixel;

in response to a determination that the depth of the image pixel is greater than the depth of the virtual object pixel, displaying the virtual object pixel; and in response to a determination that the depth of the virtual object pixel is greater than the depth of the image object pixel, performing placement processing for the virtual object pixel.

23. A method executed by one or more computing devices of an image processing platform, the method comprising:

accessing a photorealistic image of a room;

generating at least one segmentation mask that identifies real objects included in the photorealistic image;

generating geometric surface information for the photorealistic image;

generating a dense depthmap that includes depth estimates for each pixel of the photorealistic image;

transmitting at least one segmentation mask, the dense depthmap, and the geometric surface information to an end user application executed by a user device;

receiving user selection information identifying selected portions of at least one real object to be removed from the photorealistic image; and for each pixel in the selected portions:

estimating a new depth for the pixel and updating the dense depthmap to include the new depth; and determining a replacement color for the pixel and updating the photorealistic image to include the determined color.

24. An image processing apparatus, the apparatus comprising:

one or more processors; and one or more memories operatively coupled to at least one of the one or more processors and having instructions stored thereon that, when executed by at least one of the one or more processors, cause at least one of the one or more processors to:

access a photorealistic image of a room;

generate at least one segmentation mask that identifies real objects included in the photorealistic image;

generate geometric surface information for the photorealistic image;

generate a dense depthmap that includes depth estimates for each pixel of the photorealistic image, wherein generating the dense depthmap comprises:

identifying edge pixels included in edges of real objects included in the photorealistic image based at least in part on the at least one generated segmentation mask;

for at least one edge pixel, enhancing the depth for the pixel based at least in part on depths of other edge pixels included in the same edge;

identifying planar surface pixels that are included in a planar surface identified by the generated geometric surface information; and for at least one planar surface pixel, adjusting the depth for the pixel based at least in part on depths of other planar surface pixels included in the same planar surface; and transmit at least one segmentation mask, the dense depthmap, and the geometric surface information to an end user application executed by a user device.

25. The apparatus of claim 24, wherein the end user application is configured to render at least one virtual object onto the photorealistic image based at least in part on the dense depthmap, at least one segmentation mask, and the geometric surface information.

26. The apparatus of claim 25, wherein the end user application is configured to render at least one virtual object onto the photorealistic image by, for each virtual object pixel of the virtual object:

determining a depth of the virtual object pixel;

determining a depth of an image pixel at the same location as the virtual object pixel;

in response to a determination that the depth of the image pixel is greater than the depth of the virtual object pixel, displaying the virtual object pixel; and in response to a determination that the depth of the virtual object pixel is greater than the depth of the image object pixel, displaying the image pixel.

27. The apparatus of claim 25, wherein the end user application is configured to render at least one virtual object onto the photorealistic image by, for each virtual object pixel of the virtual object:

determining a depth of the virtual object pixel;
sampling the dense depthmap to generate depthmap samples;
generating a triangular occlusion mesh;
tesselating the triangular occlusion mesh, such that the depths of the pixels of the triangular mesh correspond to depths of the depthmap samples;
registering the triangular occlusion mesh with a 3D graphics system of the user device as an invisible, z-occluding scene model; and
using the 3D graphics system to render the virtual objects with occlusion by the triangular occlusion mesh by discarding occluded virtual object pixels and compositing non-occluded virtual object pixels with the photorealistic image.

28. The apparatus of claim 24, wherein at least one of the one or more memories has further instructions stored thereon that, when executed by at least one of the one or more processors, cause at least one of the one or more processors to:
update the dense depthmap, and
transmit an updated dense depthmap to the end user application.

29. The apparatus of claim 25, wherein the end user application is configured to render at least one virtual object onto the photorealistic image by, for each virtual object pixel of the virtual object:
identifying placeability behavior of the virtual object;
mapping two-dimensional user interface pointer coordinates to three-dimensional scene coordinates based on the placeability behavior of the virtual object and nearby scene geometry;
determining a depth of the virtual object pixel;
determining a depth of an image pixel at the same location as the virtual object pixel;
in response to a determination that the depth of the image pixel is greater than the depth of the virtual object pixel, displaying the virtual object pixel; and
in response to a determination that the depth of the virtual object pixel is greater than the depth of the image object pixel, performing placement processing for the virtual object pixel.

30. The apparatus of claim 24, wherein at least one of the one or more memories has further instructions stored thereon that, when executed by at least one of the one or more processors, cause at least one of the one or more processors to:
receive user selection information identifying selected portions of at least one real object to be removed from the photorealistic image; and
for each pixel in the selected portions:
estimate a new depth for the pixel and updating the dense depthmap to include the new depth, and
determine a replacement color for the pixel and updating the photorealistic image to include the determined color.

31. An image processing apparatus, the apparatus comprising:
one or more processors; and
one or more memories operatively coupled to at least one of the one or more processors and having instructions stored thereon that, when executed by at least one of the one or more processors, cause at least one of the one or more processors to:
access a photorealistic image of a room;
generate at least one segmentation mask that identifies real objects included in the photorealistic image;
generate geometric surface information for the photorealistic image;
generate a dense depthmap that includes depth estimates for each pixel of the photorealistic image; and
transmit at least one segmentation mask, the dense depthmap, and the geometric surface information to an end user application executed by a user device;
wherein the end user application is configured to render at least one virtual object onto the photorealistic image based at least in part on the dense depthmap, at least one segmentation mask, and the geometric surface information by, for each virtual object pixel of the virtual object:
determining a depth of the virtual object pixel;
determining a depth of an image pixel at the same location as the virtual object pixel;
in response to a determination that the depth of the image pixel is greater than the depth of the virtual object pixel, displaying the virtual object pixel; and
in response to a determination that the depth of the virtual object pixel is greater than the depth of the image object pixel, displaying the image pixel.

32. An image processing apparatus, the apparatus comprising:
one or more processors; and
one or more memories operatively coupled to at least one of the one or more processors and having instructions stored thereon that, when executed by at least one of the one or more processors, cause at least one of the one or more processors to:
access a photorealistic image of a room;
generate at least one segmentation mask that identifies real objects included in the photorealistic image;
generate geometric surface information for the photorealistic image;
generate a dense depthmap that includes depth estimates for each pixel of the photorealistic image; and
transmit at least one segmentation mask, the dense depthmap, and the geometric surface information to an end user application executed by a user device;
wherein the end user application is configured to render at least one virtual object onto the photorealistic image based at least in part on the dense depthmap, at least one segmentation mask, and the geometric surface information by, for each virtual object pixel of the virtual object:
determining a depth of the virtual object pixel;
sampling the dense depthmap to generate depthmap samples;
generating a triangular occlusion mesh;
tesselating the triangular occlusion mesh, such that the depths of the pixels of the triangular mesh correspond to depths of the depthmap samples;
registering the triangular occlusion mesh with a 3D graphics system of the user device as an invisible, z-occluding scene model; and
using the 3D graphics system to render the virtual objects with occlusion by the triangular occlusion mesh by discarding occluded virtual object pixels and compositing non-occluded virtual object pixels with the photorealistic image.

33. An image processing apparatus, the apparatus comprising:
one or more processors; and
one or more memories operatively coupled to at least one of the one or more processors and having instructions stored thereon that, when executed by at least one of the one or more processors, cause at least one of the one or more processors to:
- access a photorealistic image of a room;
- generate at least one segmentation mask that identifies real objects included in the photorealistic image;
- generate geometric surface information for the photorealistic image;
- generate a dense depthmap that includes depth estimates for each pixel of the photorealistic image; and
- transmit at least one segmentation mask, the dense depthmap, and the geometric surface information to an end user application executed by a user device;
- wherein the end user application is configured to render at least one virtual object onto the photorealistic image based at least in part on the dense depthmap, at least one segmentation mask, and the geometric surface information by, for each virtual object pixel of the virtual object:
  - identifying placeability behavior of the virtual object;
  - mapping two-dimensional user interface pointer coordinates to three-dimensional scene coordinates based on the placeability behavior of the virtual object and nearby scene geometry;
  - determining a depth of the virtual object pixel;
  - determining a depth of an image pixel at the same location as the virtual object pixel;
  - in response to a determination that the depth of the image pixel is greater than the depth of the virtual object pixel, displaying the virtual object pixel; and
  - in response to a determination that the depth of the virtual object pixel is greater than the depth of the image object pixel, performing placement processing for the virtual object pixel.

34. An image processing apparatus, the apparatus comprising:
one or more processors; and
one or more memories operatively coupled to at least one of the one or more processors and having instructions stored thereon that, when executed by at least one of the one or more processors, cause at least one of the one or more processors to:
- access a photorealistic image of a room;
- generate at least one segmentation mask that identifies real objects included in the photorealistic image;
- generate geometric surface information for the photorealistic image;
- generate a dense depthmap that includes depth estimates for each pixel of the photorealistic image;
- transmit at least one segmentation mask, the dense depthmap, and the geometric surface information to an end user application executed by a user device;
- receive user selection information identifying selected portions of at least one real object to be removed from the photorealistic image; and
- for each pixel in the selected portions:
  - estimate a new depth for the pixel and updating the dense depthmap to include the new depth; and
  - determine a replacement color for the pixel and updating the photorealistic image to include the determined color.

35. At least one non-transitory computer-readable medium storing computer-readable instructions that, when executed by one or more computing devices, cause at least one of the one or more computing devices to:
- access a photorealistic image of a room;
- generate at least one segmentation mask that identifies real objects included in the photorealistic image;
- generate geometric surface information for the photorealistic image;
- generate a dense depthmap that includes depth estimates for each pixel of the photorealistic image, wherein generating the dense depthmap comprises:
  - identifying edge pixels included in edges of real objects included in the photorealistic image based at least in part on the at least one generated segmentation mask;
  - for at least one edge pixel, enhancing the depth for the pixel based at least in part on depths of other edge pixels included in the same edge;
  - identifying planar surface pixels that are included in a planar surface identified by the generated geometric surface information; and
  - for at least one planar surface pixel, adjusting the depth for the pixel based at least in part on depths of other planar surface pixels included in the same planar surface; and
- transmit at least one segmentation mask, the dense depthmap, and the geometric surface information to an end user application executed by a user device.

36. The at least one non-transitory computer-readable medium of claim 35, wherein the end user application is configured to render at least one virtual object onto the photorealistic image based at least in part on the dense depthmap, at least one segmentation mask, and the geometric surface information.

37. The at least one non-transitory computer-readable medium of claim 36, wherein the end user application is configured to render at least one virtual object onto the photorealistic image by, for each virtual object pixel of the virtual object:
- determining a depth of the virtual object pixel;
- determining a depth of an image pixel at the same location as the virtual object pixel;
- in response to a determination that the depth of the image pixel is greater than the depth of the virtual object pixel, displaying the virtual object pixel; and
- in response to a determination that the depth of the virtual object pixel is greater than the depth of the image object pixel, displaying the image pixel.

38. The at least one non-transitory computer-readable medium of claim 36, wherein the end user application is configured to render at least one virtual object onto the photorealistic image by, for each virtual object pixel of the virtual object:
- determining a depth of the virtual object pixel;
- sampling the dense depthmap to generate depthmap samples;
- generating a triangular occlusion mesh;
- tesselating the triangular occlusion mesh, such that the depths of the pixels of the triangular mesh correspond to depths of the depthmap samples;
- registering the triangular occlusion mesh with a 3D graphics system of the user device as an invisible, z-occluding scene model; and
- using the 3D graphics system to render the virtual objects with occlusion by the triangular occlusion mesh by discarding occluded virtual object pixels and compositing non-occluded virtual object pixels with the photorealistic image.

39. The at least one non-transitory computer-readable medium of claim 36, wherein the end user application is configured to render at least one virtual object onto the photorealistic image by, for each virtual object pixel of the virtual object:
    identifying placeability behavior of the virtual object;
    mapping two-dimensional user interface pointer coordinates to three-dimensional scene coordinates based on the placeability behavior of the virtual object and nearby scene geometry;
    determining a depth of the virtual object pixel;
    determining a depth of an image pixel at the same location as the virtual object pixel;
    in response to a determination that the depth of the image pixel is greater than the depth of the virtual object pixel, displaying the virtual object pixel; and
    in response to a determination that the depth of the virtual object pixel is greater than the depth of the image object pixel, performing placement processing for the virtual object pixel.

40. The at least one non-transitory computer-readable medium of claim 35, wherein at least one of the one or more memories has further instructions stored thereon that, when executed by at least one of the one or more processors, cause at least one of the one or more processors to:
    update the dense depthmap, and
    transmit an updated dense depthmap to the end user application.

41. The at least one non-transitory computer-readable medium of claim 35, wherein at least one of the one or more memories has further instructions stored thereon that, when executed by at least one of the one or more processors, cause at least one of the one or more processors to:
    receive user selection information identifying selected portions of at least one real object to be removed from the photorealistic image; and
    for each pixel in the selected portions:
        estimate a new depth for the pixel and updating the dense depthmap to include the new depth, and
        determine a replacement color for the pixel and updating the photorealistic image to include the determined color.

42. At least one non-transitory computer-readable medium storing computer-readable instructions that, when executed by one or more computing devices, cause at least one of the one or more computing devices to:
    access a photorealistic image of a room;
    generate at least one segmentation mask that identifies real objects included in the photorealistic image;
    generate geometric surface information for the photorealistic image;
    generate a dense depthmap that includes depth estimates for each pixel of the photorealistic image; and
    transmit at least one segmentation mask, the dense depthmap, and the geometric surface information to an end user application executed by a user device;
    wherein the end user application is configured to render at least one virtual object onto the photorealistic image based at least in part on the dense depthmap, at least one segmentation mask, and the geometric surface information by, for each virtual object pixel of the virtual object:
        determining a depth of the virtual object pixel;
        determining a depth of an image pixel at the same location as the virtual object pixel;
        in response to a determination that the depth of the image pixel is greater than the depth of the virtual object pixel, displaying the virtual object pixel; and
        in response to a determination that the depth of the virtual object pixel is greater than the depth of the image object pixel, displaying the image pixel.

43. At least one non-transitory computer-readable medium storing computer-readable instructions that, when executed by one or more computing devices, cause at least one of the one or more computing devices to:
    access a photorealistic image of a room;
    generate at least one segmentation mask that identifies real objects included in the photorealistic image;
    generate geometric surface information for the photorealistic image;
    generate a dense depthmap that includes depth estimates for each pixel of the photorealistic image; and
    transmit at least one segmentation mask, the dense depthmap, and the geometric surface information to an end user application executed by a user device;
    wherein the end user application is configured to render at least one virtual object onto the photorealistic image based at least in part on the dense depthmap, at least one segmentation mask, and the geometric surface information by, for each virtual object pixel of the virtual object:
        determining a depth of the virtual object pixel;
        sampling the dense depthmap to generate depthmap samples;
        generating a triangular occlusion mesh;
        tesselating the triangular occlusion mesh, such that the depths of the pixels of the triangular mesh correspond to depths of the depthmap samples;
        registering the triangular occlusion mesh with a 3D graphics system of the user device as an invisible, z-occluding scene model; and
        using the 3D graphics system to render the virtual objects with occlusion by the triangular occlusion mesh by discarding occluded virtual object pixels and compositing non-occluded virtual object pixels with the photorealistic image.

44. At least one non-transitory computer-readable medium storing computer-readable instructions that, when executed by one or more computing devices, cause at least one of the one or more computing devices to:
    access a photorealistic image of a room;
    generate at least one segmentation mask that identifies real objects included in the photorealistic image;
    generate geometric surface information for the photorealistic image;
    generate a dense depthmap that includes depth estimates for each pixel of the photorealistic image; and
    transmit at least one segmentation mask, the dense depthmap, and the geometric surface information to an end user application executed by a user device;
    wherein the end user application is configured to render at least one virtual object onto the photorealistic image based at least in part on the dense depthmap, at least one segmentation mask, and the geometric surface information by, for each virtual object pixel of the virtual object:
        identifying placeability behavior of the virtual object;
        mapping two-dimensional user interface pointer coordinates to three-dimensional scene coordinates based on the placeability behavior of the virtual object and nearby scene geometry;
        determining a depth of the virtual object pixel;
        determining a depth of an image pixel at the same location as the virtual object pixel;

in response to a determination that the depth of the image pixel is greater than the depth of the virtual object pixel, displaying the virtual object pixel; and in response to a determination that the depth of the virtual object pixel is greater than the depth of the image object pixel, performing placement processing for the virtual object pixel.

45. At least one non-transitory computer-readable medium storing computer-readable instructions that, when executed by one or more computing devices, cause at least one of the one or more computing devices to:

access a photorealistic image of a room;

generate at least one segmentation mask that identifies real objects included in the photorealistic image;

generate geometric surface information for the photorealistic image;

generate a dense depthmap that includes depth estimates for each pixel of the photorealistic image;

transmit at least one segmentation mask, the dense depthmap, and the geometric surface information to an end user application executed by a user device;

receive user selection information identifying selected portions of at least one real object to be removed from the photorealistic image; and for each pixel in the selected portions:

estimate a new depth for the pixel and updating the dense depthmap to include the new depth; and determine a replacement color for the pixel and updating the photorealistic image to include the determined color.

* * * * *